United States Patent
Hotta et al.

(10) Patent No.: US 11,764,401 B2
(45) Date of Patent: Sep. 19, 2023

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 139 days.

(21) Appl. No.: 16/557,311

(22) Filed: Aug. 30, 2019

(65) Prior Publication Data
US 2020/0295403 A1   Sep. 17, 2020

(30) Foreign Application Priority Data
Mar. 14, 2019 (JP) .................. 2019-046848

(51) Int. Cl.
*H01M 10/0567* (2010.01)
*H01M 8/06* (2016.01)
(Continued)

(52) U.S. Cl.
CPC ..... *H01M 10/0567* (2013.01); *H01M 8/0693* (2013.01); *H01M 8/1023* (2013.01); *H01M 8/1039* (2013.01); *H01M 8/1053* (2013.01)

(58) Field of Classification Search
CPC ... H01M 10/05–0567; H01M 10/0567; H01M 8/0693; H01M 8/1023; H01M 8/1039; H01M 8/1053
See application file for complete search history.

(56) References Cited

U.S. PATENT DOCUMENTS 6,403,253 B1   6/2002   Wainwright et al.
6,761,945 B1 *  7/2004   Adachi ............. H01M 8/02
                                                            428/36.1
(Continued)

FOREIGN PATENT DOCUMENTS

JP   9-508490 A    8/1997
JP   2000-77073 A  3/2000
(Continued)

OTHER PUBLICATIONS

S. Liu, et al., "Rechargeable Aqueous Lithium-Ion Battery of TiO2/LiMn2O4 with a High Voltage", Journal of the Electrochemical Society, 158(12) A1490-A1497 (2011), 8 pages.

*Primary Examiner* — Cynthia H Kelly
*Assistant Examiner* — Niara Trant
(74) *Attorney, Agent, or Firm* — Oblon, McClelland, Maier & Neustadt, L.L.P.

(57) ABSTRACT

According to one embodiment, there is provided a secondary battery including a negative electrode, a positive electrode, a first electrolyte, a second electrolyte, and a hydrogel electrolyte. The first electrolyte is in contact with at least a part of the negative electrode. The second electrolyte is in contact with at least a part of the positive electrode. The hydrogel electrolyte includes a gel having a chemically crosslinked structure. A first electrolyte composition of the first electrolyte is different from a second electrolyte composition of the second electrolyte. At least one of the first electrolyte and the second electrolyte includes an aqueous solvent, the aqueous solvent including water. At least a part of at least one of the negative electrode and the positive electrode overlaps at least a part of the hydrogel electrolyte.

16 Claims, 7 Drawing Sheets

(51) Int. Cl.
*H01M 8/1053* (2016.01)
*H01M 8/1039* (2016.01)
*H01M 8/1023* (2016.01)

(56) References Cited

U.S. PATENT DOCUMENTS

| | | | |
|---|---|---|---|
| 10,079,390 B2 | 9/2018 | Matsuno et al. | |
| 2002/0102464 A1* | 8/2002 | Yoshida | H01M 10/0565 |
| | | | 429/300 |
| 2012/0264025 A1* | 10/2012 | Suto | H01M 6/04 |
| | | | 429/405 |
| 2013/0011714 A1* | 1/2013 | Han | H01M 50/186 |
| | | | 429/131 |
| 2014/0287285 A1* | 9/2014 | Inagaki | H01M 10/0525 |
| | | | 429/90 |
| 2017/0077552 A1* | 3/2017 | Taeda | H01M 10/0569 |
| 2018/0269537 A1 | 9/2018 | Yoshima et al. | |
| 2018/0277899 A1 | 9/2018 | Takami et al. | |
| 2019/0089011 A1 | 3/2019 | Seki et al. | |
| 2019/0089012 A1 | 3/2019 | Hotta et al. | |

FOREIGN PATENT DOCUMENTS

| | | | |
|---|---|---|---|
| JP | 2001-210359 A | 8/2001 | |
| JP | 2003-17057 A | 1/2003 | |
| JP | 2005-71807 A | 3/2005 | |
| JP | 6321287 B2 | 5/2018 | |
| JP | 6386121 B2 | 9/2018 | |
| JP | 2018-156837 A | 10/2018 | |
| JP | 2018-160342 A | 10/2018 | |
| JP | 2018-160443 A | 10/2018 | |
| JP | 2019-33075 A | 2/2019 | |
| JP | 2019-57360 A | 4/2019 | |
| JP | 2019-57373 A | 4/2019 | |
| WO | WO-2010052542 A1 * | 5/2010 | H01M 10/0587 |

* cited by examiner

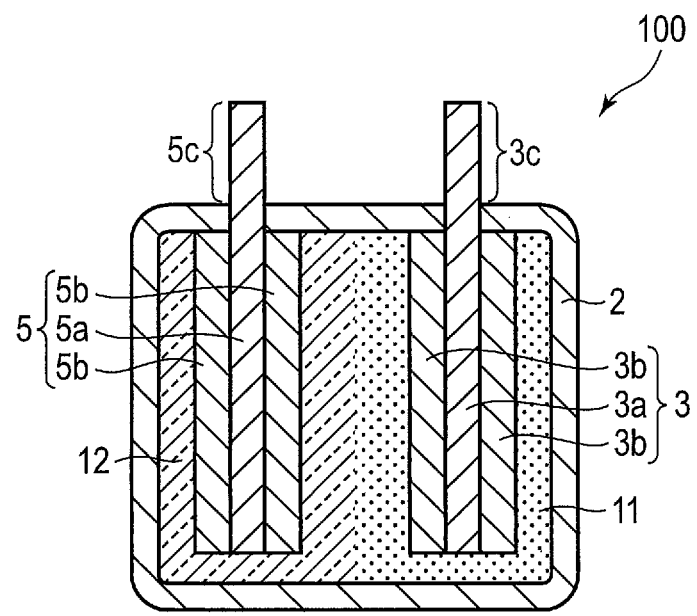
F I G. 4
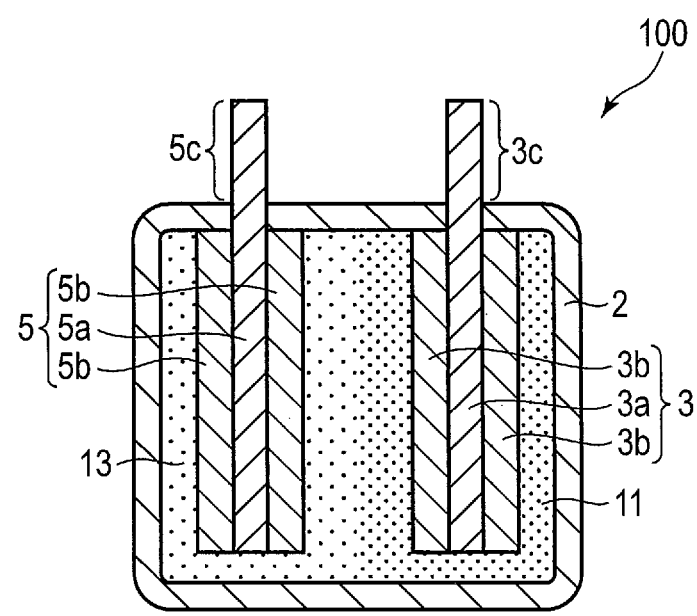
F I G. 5

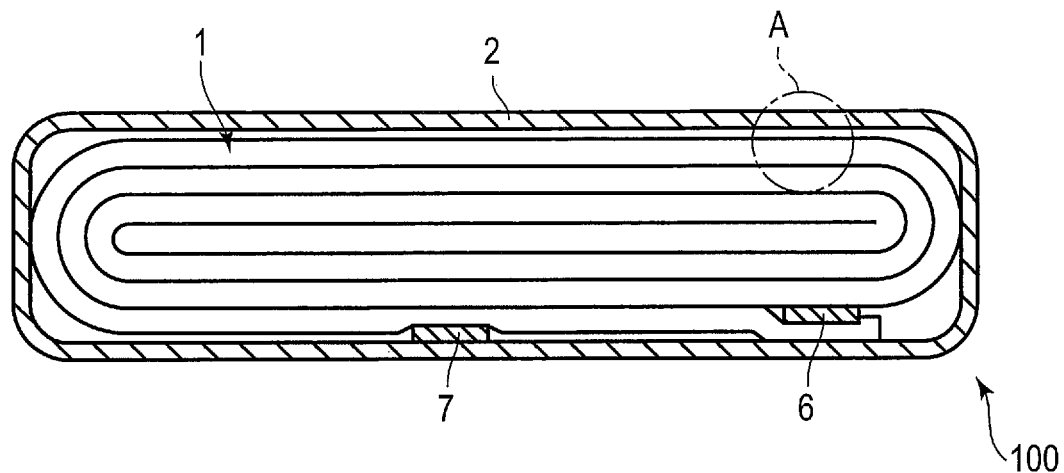
F I G. 6
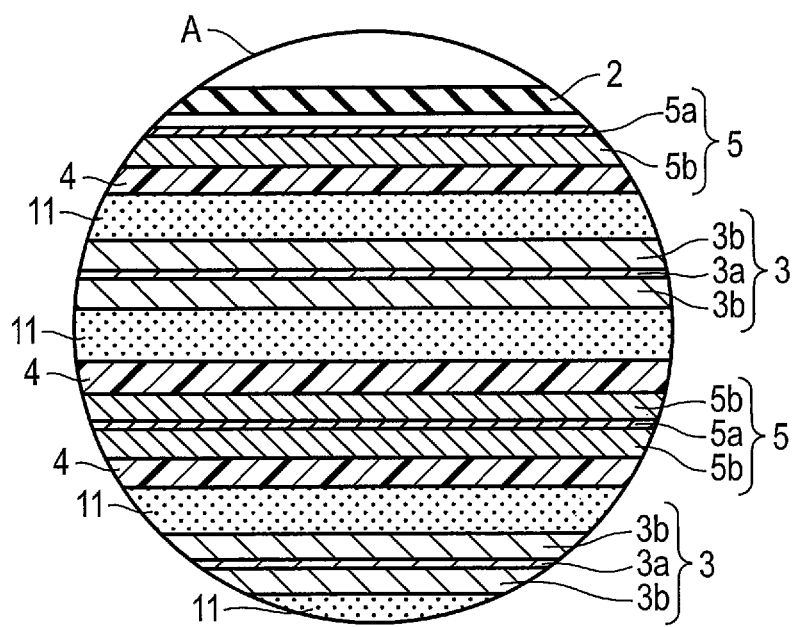
F I G. 7

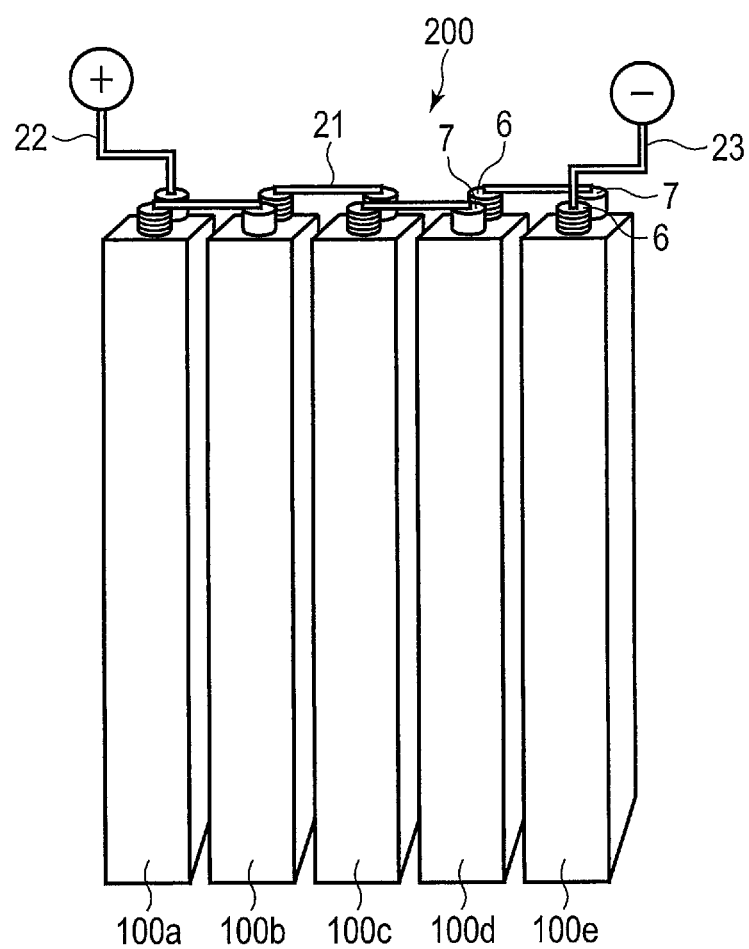
F I G. 8

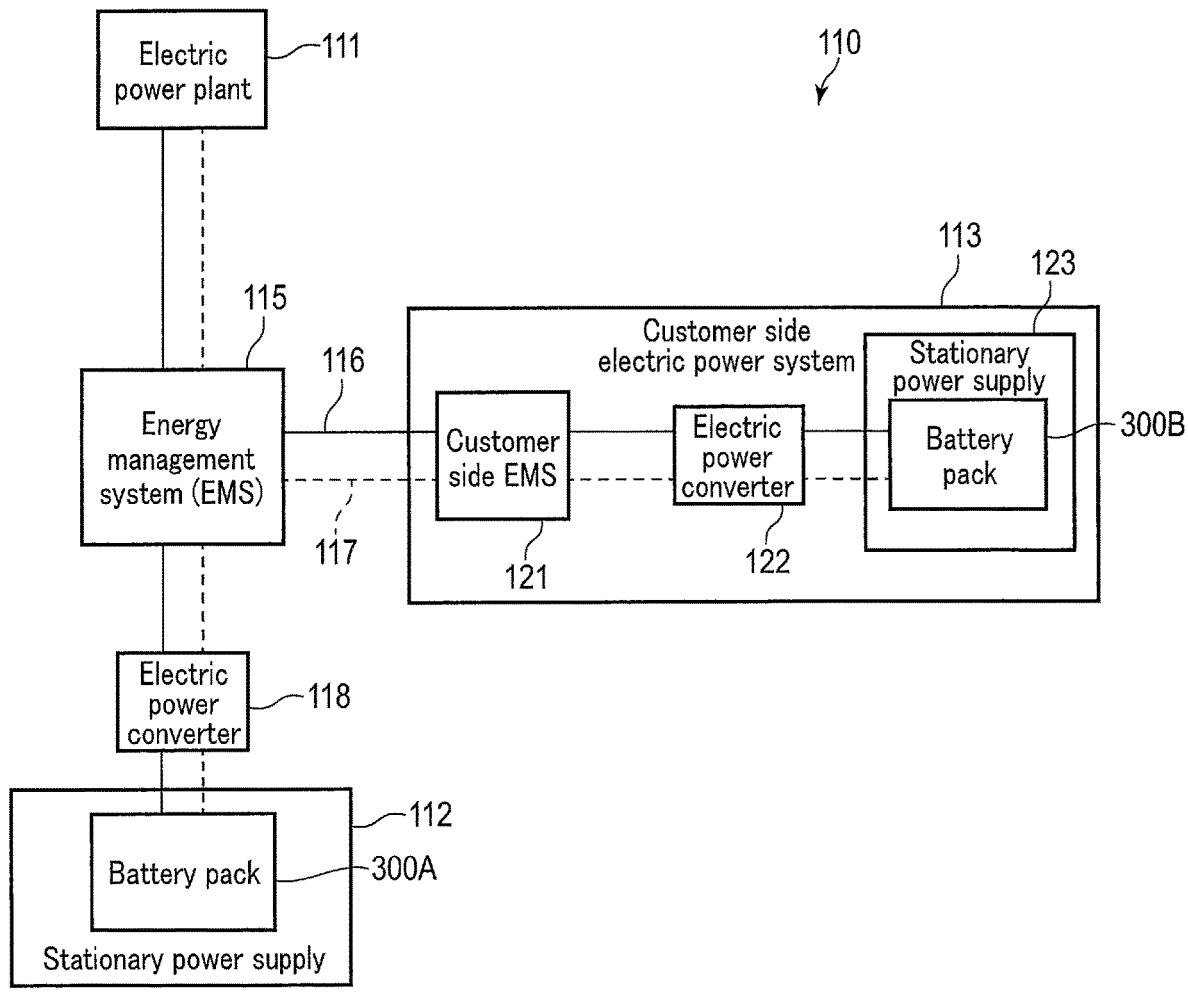
F I G. 12

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2019-046848, filed Mar. 14, 2019, the entire contents of which is incorporated herein by reference.

FIELD

Embodiments described herein relate generally to a secondary battery, a battery pack, a vehicle, and a stationary power supply.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric automobiles and the like. As an electrolytic solution of the lithium secondary battery, a nonaqueous organic solvent prepared by mixing ethylene carbonate, methylethyl carbonate and the like is used, unlike a nickel-hydrogen battery or a lead storage battery. An electrolytic solution prepared using such a solvent has higher oxidation resistance and higher reduction resistant property compared to those of an aqueous electrolytic solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed using an organic solvent is theoretically inferior to that of a secondary battery formed using an aqueous solution. In order to improve the safety of a lithium secondary battery formed using an electrolytic solution containing an organic solvent, various countermeasures have been made; however, one cannot be certain that the countermeasures are sufficient. Furthermore, in the production process of the nonaqueous lithium secondary battery, a dry environment is necessary, thereby inevitably increasing the production cost. In addition, the electrolytic solution containing an organic solvent is inferior in electrical conductivity, whereby an internal resistance of the nonaqueous lithium secondary battery is easily increased. Such problems are large defects for applications in electric vehicles or hybrid electric vehicles and large-sized storage batteries for stationary energy storage, where there is emphasis on the battery safety and cost.

In order to solve these problems, converting the electrolytic solution to an aqueous solution is under consideration. With an aqueous electrolytic solution, it is necessary that the potential range, in which charge/discharge of a battery is performed, be limited to a potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 V to 1.5 V, an energy density sufficient as a battery is hardly obtained.

When a lithium manganese oxide is used as the positive electrode active material and a lithium titanium oxide such as $LiTi_2O_4$ or $Li_4Ti_5O_{12}$ is used as the negative electrode active material, an electromotive force of about 2.6 V to 2.7 V can be theoretically obtained. Such a battery may also be attractive from the viewpoint of energy density. A nonaqueous lithium secondary battery formed using such a combination of the positive and negative electrode materials exhibits an excellent life performance, and has therefore already been in practical use. However, in the aqueous electrolytic solution, the lithium titanium oxide has a lithium insertion/extraction potential of about 1.5 V (vs. $Li/Li^+$) based on lithium potential, whereby electrolysis easily occurs. On the other hand, there also is a problem with the lithium manganese oxide at the positive electrode, too, where gas is generated due to occurrence of oxidation of cations in the aqueous solution. Thereby, satisfactory charge and discharge had not been possible.

BRIEF DESCRIPTION OF THE DRAWINGS

FIG. 4 is a sectional view schematically showing an example of the secondary battery according to an embodiment;

FIG. 5 is a sectional view schematically showing another example of the secondary battery according to the embodiment;

FIG. 6 is a sectional view schematically showing a further other example of the secondary battery according to the embodiment;

FIG. 7 is an enlarged sectional view showing section A in FIG. 6;

FIG. 8 is a perspective view schematically showing an example of a battery module according to an embodiment;

FIG. 12 is a block diagram showing an example of a system including the stationary power supply according to an embodiment.

DETAILED DESCRIPTION

Figure 1:
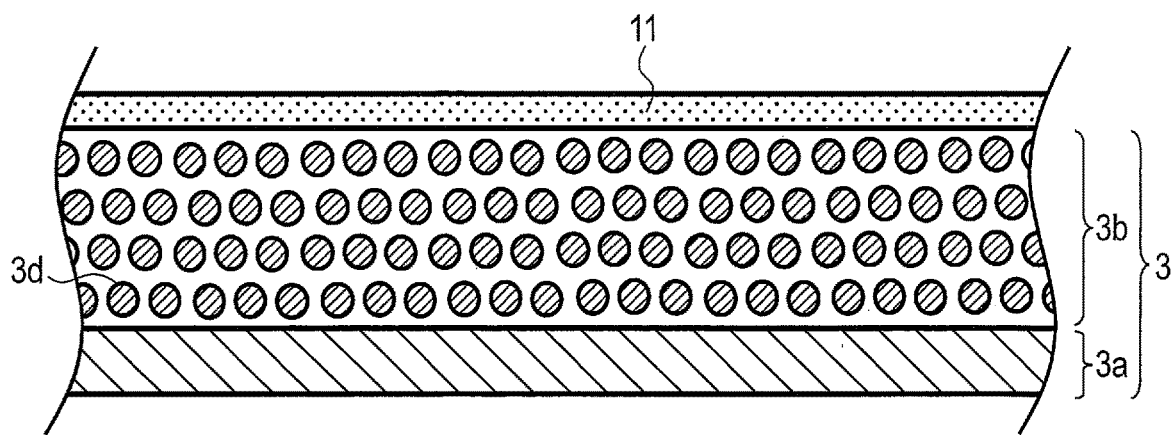
FIG. 1 is a sectional view schematically showing an example of an electrode covered with a hydrogel electrolyte according to an embodiment.

According to one embodiment, there is provided a secondary battery including a negative electrode, a positive electrode, a first electrolyte, a second electrolyte, and a hydrogel electrolyte. The first electrolyte is in contact with at least a part of the negative electrode. The second electrolyte is in contact with at least a part of the positive electrode. The hydrogel electrolyte includes a gel having a chemically crosslinked structure. A first electrolyte composition of the first electrolyte is different from a second electrolyte composition of the second electrolyte. At least one of the first electrolyte and the second electrolyte includes an aqueous solvent, the aqueous solvent including water. At least a part of at least one of the negative electrode and the positive electrode overlaps at least a part of the hydrogel electrolyte.

According to another embodiment, there is provided a battery pack including the secondary battery according to the above embodiment.

According to still another embodiment, there is provided a vehicle including the battery pack according to the above embodiment.

According to still another embodiment, there is provided a stationary power supply including the battery pack according to the above embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

The secondary battery according to a first embodiment includes a negative electrode, a positive electrode, a first electrolyte, a second electrolyte, and a hydrogel electrolyte. The first electrolyte is in contact with at least a part of the negative electrode. The second electrolyte is in contact with at least a part of the positive electrode. The hydrogel electrolyte includes a gel having a chemically crosslinked structure. A first electrolyte composition of the first electrolyte and a second electrolyte composition of the second electrolyte differ from one another. At least one of the first electrolyte and the second electrolyte is an aqueous electrolyte that includes an aqueous solvent including water. There is overlap between at least a part of the hydrogel electrolyte and at least a part of at least one of the negative electrode and the positive electrode.

The present inventors found that in a case of using an aqueous electrolytic solution, that is, an aqueous electrolyte, as an electrolyte of a secondary battery, by using electrolytes that are appropriately adjusted with respect to each of a negative electrode and a positive electrode, electrolysis of water in the electrolyte can be suppressed. For example, as an application based on this finding, a concentration of lithium contained in an electrolyte that is in contact with the negative electrode is made higher than a concentration of lithium contained in an electrolyte that is in contact with the positive electrode. Thereby, the hydrogen generation overvoltage of the negative electrode increases, and the oxygen generation overvoltage of the positive electrode decreases. Therefore, it is possible to suppress hydrogen generation at the negative electrode and to suppress oxygen generation at the positive electrode. In addition, it is possible to obtain the same effect when the electrolyte in contact with the negative electrode is basic, while the electrolyte in contact with the positive electrode is acidic. As a result, it is possible to obtain a secondary battery exhibiting excellent charge-discharge efficiency, self-discharge-resistance performance and life performance.

Hereinafter, the secondary battery according to the embodiment will be described in detail.

As a method of separating the two electrolytes of the first electrolyte in contact with the negative electrode and the second electrolyte in contact with the positive electrode, the separation can be achieved by having at least one electrode between the negative electrode and the positive electrode overlap the hydrogel electrolyte. At least a part of only the negative electrode may overlap at least a part of the hydrogel electrolyte. Otherwise, at least a part of only the positive electrode may overlap at least a part of the hydrogel electrolyte. Alternatively, at least respective parts of both electrodes of the negative electrode and the positive electrode may overlap at least a part of the hydrogel electrolyte.

Here, "overlapping" the electrode with the hydrogel electrolyte also includes a state in which the electrode is not in contact with a gel. Although not limited to these examples, a state in which at least a part of the electrode overlaps at least a part of the hydrogel electrolyte includes both a state in which the hydrogel electrolyte is directly in contact with at least a part of an electrode surface and a state in which the electrode is positioned within a space formed by the hydrogel electrolyte without direct contact between the electrode and the hydrogel electrolyte, for example. Specific examples of the former include a state in which the electrode is covered with the hydrogel electrolyte, for example. Examples include a state in which at least a part of an electrode active material-containing layer that the electrode may include, such as a principal surface of the active material-containing layer is covered with the hydrogel electrolyte. Specific examples of the latter include states such as a state where a principal surface of the hydrogel electrolyte having a sheet shape or a film shape and a principal surface of the electrode such as the principal surface of the active material-containing layer are disposed within a battery while being separated from each other so as to be substantially parallel to each other, and a state in which an electrode is contained within a hydrogel electrolyte formed into a container having a bag shape or the like. A shape of the hydrogel electrolyte is not limited to the sheet shape or the film shape. For example, the hydrogel electrolyte may be formed into the sheet shape or the film shape and then crushed. The hydrogel electrolyte crushed in this manner may be disposed onto the principal surface of the electrode by being applied or the like. In a state in which the hydrogel electrolyte is directly in contact with at least a part of the electrode surface, the electrode can be said to be equipped with the hydrogel electrolyte.

The hydrogel electrolyte contains a gel having a chemically crosslinked structure. So-called gels can be classified into "physical gels" and "chemical gels" according to differences in molecular crosslinking method. The former is a gel crosslinked through hydrogen bonding, ionic bonding, simple entanglement of molecular chains, or the like. In the physical gels, reversible sol-gel transition may occur due to an external stimulus such as heat, or structural disintegration may occur due to a change in amount of a solvent component. Meanwhile, the chemical gel is stable as long as decomposition of the molecular chain does not proceed. A hydrogel indicates a gel in a state of containing an aqueous solution therein. The hydrogel electrolyte according to the embodiment contains a chemical gel that is three-dimensionally crosslinked through covalent bonding, and an aqueous electrolyte is contained within the chemical gel.

Such a hydrogel electrolyte contains the chemical gel having the chemically crosslinked structure and, thus, exhibits high durability such as high-temperature resistance. For example, the hydrogel electrolyte exhibits higher durability than an electrolyte obtained using the physical gel containing carboxymethyl cellulose (CMC) or the like. Moreover, the chemical gel has high osmotic pressure, that is, has a high force of retaining a solvent. Accordingly, mixing hardly occurs between a solution included within the hydrogel and a solution present outside, and thus stable separation of the solutions is capable.

Whether a gel is the physical gel or the chemical gel can be determined as follows. A hydrogel sample is washed with water. Then, the sample is processed depending on a form of the hydrogel. A sheet-shaped hydrogel is cut into test pieces having a size of 2 $cm^2$, for example. A gel hydrogel is molded into a bulk structure having a size of 2 $cm^3$, for example. The obtained hydrogel sample processed into a sheet or molded body is put in 1 L of a sodium hydroxide aqueous solution having a temperature of 50° C. The solution is stirred while the sample is immersed. When the sample maintains the original shape after one hour of stirring, the sample can be determined as being the chemical gel. When the sample disintegrates, the sample can be determined as had been being the physical gel. The chemical gel having a structure obtained by chemical crosslinking through the covalent bonding or the like has a limit to swelling by solvent(s). Therefore, even when the chemical gel is exposed to a large amount of solvent, the chemical gel can maintain the structure. In contrast, a degree of crosslinking in the physical gel changes depending on an amount of solvent. Therefore, the physical gel dissolves in water with a certain amount or more of solvent.

A retaining property of a solution by a gel can be evaluated as follows. In the case of a gel hydrogel, for example, the gel is molded into a bulk structure having a size of 2 $cm^3$. A load of 1 $gf/mm^2$ is uniformly applied for a certain time onto a top surface of the bulk, and the weight reduction during this time is evaluated. A chemical gel contained in the hydrogel electrolyte according to the embodiment desirably has 10% or less of a reduction rate of weight when evaluation is performed as described above.

A state of overlapping of the electrode with the hydrogel electrolyte is not particularly limited. For example, sheet-shaped hydrogel electrolyte may be provided at one surface on the electrode. For example, at least a part of a principal surface of an active material-containing layer of the electrode may be covered with the hydrogel electrolyte. Alternatively, a bag-shaped gel electrolyte may be wrapped around the electrode. As another example, the electrode may be capped with a hydrogel electrolyte having a cap or hat shape with respect to the electrode.

In addition, a specific example of a state of overlapping the electrode with the hydrogel electrolyte may include a state in which an inside of the electrode is impregnated with an aqueous electrolyte, and the electrode surface is covered with a hydrogel sheet made to swell by the same aqueous electrolyte. In this manner, it is possible to prevent an electrolyte for a counter electrode from infiltrating the electrode. That is, it is possible to prevent the second electrolyte at a positive electrode side from permeating into the negative electrode and to prevent the first electrolyte at a negative electrode side from permeating into the positive electrode.

Desirably, the negative electrode, the positive electrode and the hydrogel electrolyte are each disposed such that at least a part of the hydrogel electrolyte overlaps an entire range of an area where the negative electrode overlaps the positive electrode. For example, in a case where a principal surface of an active material-containing layer of the negative electrode (negative electrode active material-containing layer) faces a principal surface of an active material-containing layer of the positive electrode (positive electrode active material-containing layer) which is a counter electrode to the negative electrode, at least parts of positions of respective principal surfaces may overlap each other in a plane direction. Desirably, at least a portion among the negative electrode and positive electrode, in which the respective principal surfaces of the negative electrode active material-containing layer and the positive electrode active material-containing layer overlap each other, overlaps at least a part of the hydrogel electrolyte. Preferably, in one of the electrodes, at least a face among the electrode surface that faces in a direction toward the counter electrode is covered with the hydrogel electrolyte.

On one hand, for example, when a basic electrolyte solution is used at the negative electrode, the hydrogen generation overvoltage increases. Due to this, the decomposition of water is suppressed, and thereby excellent charge-discharge efficiency is obtained. On the other hand, when an acidic electrolyte solution is used at the positive electrode, it is possible to suppress the oxygen generation. The hydrogel electrolyte can prevent the basic electrolyte of the negative electrode and the acidic electrolyte of the positive electrode from being mixed and neutralized. Further, flowing of water within the hydrogel is remarkably suppressed, and thus the water can be inhibited from coming into contact with the negative electrode. Therefore, it is possible to suppress self-discharge even in a high state of charge (SOC). From the viewpoint of suppressing the self-discharge, it is preferable to use the hydrogel electrolyte for at least the negative electrode side.

The hydrogel electrolyte has conductivity of a carrier ion such as a Li ion. In this case, the carrier ion is solvated with a solvent in the hydrogel electrolyte. Therefore, as the carrier ion moves, there may be some degree of movement of the solvent. That is, the hydrogel electrolyte does not completely segregate the first electrolyte from the second electrolyte.

The electrolyte contained in the secondary battery according to the embodiment includes the first electrolyte that contacts the negative electrode and the second electrolyte that contacts the positive electrode. One or both of the first electrolyte and the second electrolyte may be an aqueous electrolyte containing an aqueous solvent including water. The first electrolyte which is an aqueous electrolyte is referred to as a first aqueous electrolyte, for convenience. The first aqueous electrolyte contains a first electrolyte salt and a first solvent including water. Similarly, the second electrolyte which is an aqueous electrolyte is referred to as a second aqueous electrolyte, for convenience. The second aqueous electrolyte contains a second electrolyte salt and a second solvent containing water.

One of the first electrolyte and the second electrolyte may be the aqueous electrolyte, and the other may be a nonaqueous electrolyte containing a nonaqueous solvent. For example, the secondary battery may contain the first aqueous electrolyte in contact with the negative electrode and a nonaqueous electrolyte in contact with the positive electrode. Alternatively, the secondary battery may contain a nonaqueous electrolyte in contact with the negative electrode and the second aqueous electrolyte in contact with the positive electrode.

A first electrolyte composition of the first electrolyte is different from a second electrolyte composition of the second electrolyte. The preferable composition is different between the electrolyte at the negative electrode side and the electrolyte at the positive electrode side. At least one electrode of the negative electrode and the positive electrode is disposed to overlap the hydrogel electrolyte, and thereby it is possible to prevent the first electrolyte at the negative electrode side and the second electrolyte at the positive electrode side from being mixed. For example, at least part(s) of one or both of the negative electrode and the positive electrode is covered with or surrounded by the hydrogel electrolyte, and thereby it is possible to separate the first electrolyte from the second electrolyte. Accordingly, it is possible to employ the first electrolyte composition and the second electrolyte composition which are different from each other in composition respectively for the first electrolyte and the second electrolyte, and thus it is possible to apply electrolytes having preferred compositions for the negative electrode and the positive electrode, respectively.

The negative electrode may be impregnated with at least a part of the first electrolyte. In addition, at least a part of the first electrolyte (first aqueous electrolyte) may be contained in the hydrogel electrolyte. The hydrogel electrolyte containing the first aqueous electrolyte may sometimes be referred to as a first hydrogel electrolyte, herein. A part of the first aqueous electrolyte may be present in a space that could be provided between the negative electrode and the hydrogel electrolyte.

On the other hand, the positive electrode may be impregnated with at least a part of the second electrolyte. At least a part of the second electrolyte (second aqueous electrolyte) may be contained in the hydrogel electrolyte. The hydrogel electrolyte containing the second aqueous electrolyte may sometimes be referred to as a second hydrogel electrolyte, herein. A part of the second electrolyte may be present in a space that could be provided between the positive electrode and the hydrogel electrolyte.

In this manner, at least part(s) of at least one of the first electrolyte (first aqueous electrolyte) and the second electrolyte (second aqueous electrolyte) may be contained in the hydrogel electrolyte.

As an example of a production method of the hydrogel electrolyte, there may be adopted a method of putting a predetermined amount of crosslinking agent into a solution obtained by dissolving a polysaccharide in a liquid electrolyte prepared for each of the electrodes, thereby gelling the solution. In the case a high concentration of alkali salt is used, it is difficult for the hydrogel electrolyte to be produced. Hence, another example of the method includes a method of putting a predetermined amount of crosslinking agent into a solution obtained by dissolving a polysaccharide in a polar solvent such as water or alcohol whereby the solution is gelled, then temporarily drying the obtained chemical gel, and thereafter causing the chemical gel to swell again with a desired electrolyte aqueous solution. The production method of the hydrogel electrolyte is not limited thereto. There is no restriction on the production method, so long as the production method yields a hydrogel electrolyte that includes the chemical gel having the structure where a water-soluble polysaccharide is chemically crosslinked, and is swollen by the aqueous electrolyte. Further, in a case where the chemical gel is molded into a sheet shape, for example, a porous film such as a nonwoven fabric may be impregnated with a solution that has not been gelled yet, and the solution may be gelled thereafter. In addition, it is possible to form the sheet shape without impregnating the nonwoven fabric or the like with the solution before gelling.

The hydrogel electrolyte and the electrodes may be individually produced, and thereafter, the obtained hydrogel electrolyte and electrodes may be arranged to overlap. Alternatively, the production of the hydrogel electrolyte and the production of the electrodes may be simultaneously performed. As an example of the former, the produced hydrogel electrolyte may be disposed onto the electrode, or the produced hydrogel electrolyte may be wrapped around the electrode. As another example of the former, a hydrogel electrolyte in a state of a suspension containing a chemical gel and an electrolyte solution may be applied onto the electrode. As an example of the latter, gel powder may be mixed into an electrode mixture containing an active material in advance, with which the electrode is produced, whereupon an electrode having an electrode active material-containing layer covered with the hydrogel electrolyte can be produced when a desired electrolyte solution is introduced. In this case, a large amount of gel is desirably distributed in the vicinity of a surface of the electrode active material-containing layer. After the electrode is produced having had the gel mixed into the electrode mixture, more gel may be further disposed onto the front surface of the electrode active material-containing layer. In addition, an electrode may be immersed in the hydrogel electrolyte in the state of the suspension containing the chemical gel and the electrolyte solution, to produce an electrode having an electrode active material-containing layer covered with the hydrogel electrolyte.

With reference to the drawings, an example of covering of the electrode with the hydrogel electrolyte is described.

FIG. 1 is a sectional view schematically showing an example of the electrode covered with the hydrogel electrolyte according to the embodiment. FIG. 1 illustrates an example in which the sheet-shaped hydrogel electrolyte is present on a surface of the electrode. Described here as a specific example is an example, in which the negative electrode is used; however, the positive electrode may be used in place of the negative electrode.

A negative electrode 3 includes a negative electrode current collector 3a and a negative electrode active material-containing layer 3b on the negative electrode current collector 3a. The negative electrode active material-containing layer 3b contains particulate negative electrode active material 3d, for example. In order to promote understanding, a simple example in which the negative electrode active material-containing layer 3b is provided only on one surface of the negative electrode current collector 3a is illustrated. For example, the negative electrode active material-containing layer 3b may be provided on each of front and back principal surfaces of the negative electrode current collector 3a having a foil shape. As will be described later, the negative electrode active material-containing layer 3b may contain other materials such as a binder or an electro-conductive agent in addition to the negative electrode active material 3d; however, materials other than the negative electrode active material 3d are omitted from illustration for simplification.

A first hydrogel electrolyte 11 having a sheet shape is provided on a surface at an opposite side to the negative electrode current collector 3a with the negative electrode active material-containing layer 3b interposed therebetween. The first aqueous electrolyte (not illustrated) may be contained in the first hydrogel electrolyte 11. In addition, the first electrolyte (not illustrated) may be contained inside the negative electrode active material-containing layer 3b, also.

The structure illustrated in FIG. 1 can be obtained as follows, for example. The first hydrogel electrolyte 11 having the sheet shape and the negative electrode 3 are individually produced, and the first hydrogel electrolyte 11 and the negative electrode 3 are stacked on each other. Before stacking, the first aqueous electrolyte having the first electrolyte composition which is the same as a composition of an aqueous electrolyte contained in the first hydrogel electrolyte 11 may be made to be contained in the negative electrode 3. Alternatively, an entire structure after the stacking may be immersed in the first aqueous electrolyte, to thereby permeate the first aqueous electrolyte into each of the first hydrogel electrolyte 11 and an inside of the negative electrode 3, for example. A method of covering the negative electrode 3 with the first hydrogel electrolyte 11 is not limited thereto. For example, a chemical gel sheet which does not contain the aqueous electrolyte may be stacked with the negative electrode 3, and thereafter, the aqueous electrolyte may be introduced into the chemical gel sheet, whereby it is possible to obtain the negative electrode 3 covered with the first hydrogel electrolyte 11 having the sheet shape.

Figure 2:
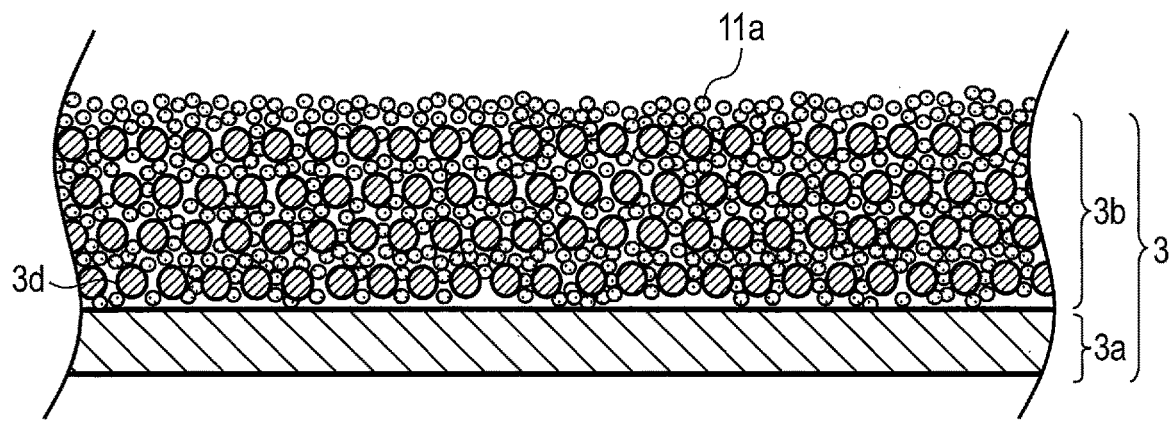
FIG. 2 is a sectional view schematically showing a state during manufacture of another example of the electrode covered with the hydrogel electrolyte according to the embodiment.
Figure 3:
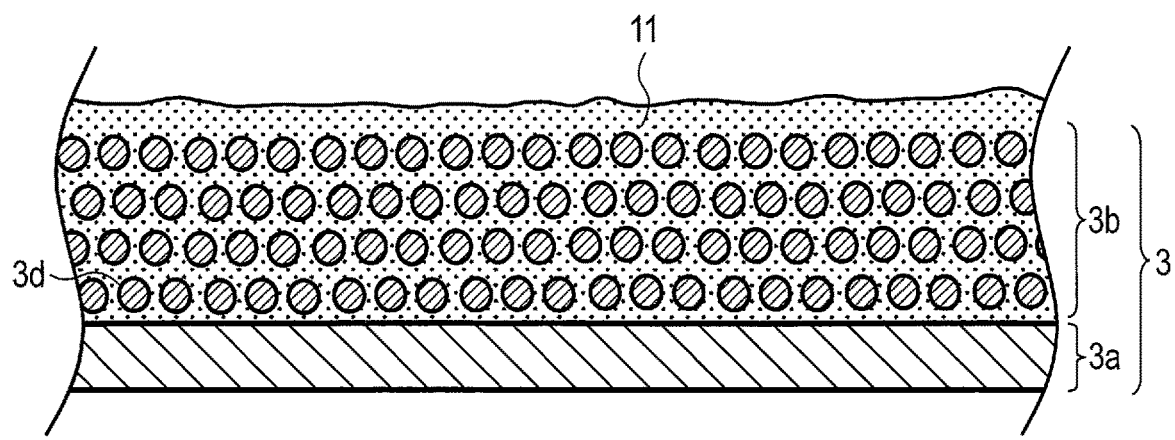
FIG. 3 is a sectional view schematically showing the other example of the electrode covered with the hydrogel electrolyte according to the embodiment.

Another example is described with reference to FIGS. 2 and 3. FIG. 2 is a sectional view schematically showing a state during manufacture of another example of the electrode covered with the hydrogel electrolyte according to the embodiment. FIG. 3 is a sectional view schematically showing the other example of the electrode covered with the hydrogel electrolyte according to the embodiment. The sectional view in FIG. 3 illustrates a state in which the hydrogel electrolyte is obtained after the midway state illustrated in FIG. 2. Here, described as a specific example is an example, in which the negative electrode is used; however, the positive electrode may be used in place of the negative electrode.

The negative electrode active material-containing layer 3b in the state midway through manufacture illustrated in FIG. 2 contains gel powder 11a as well as the negative electrode active material 3d. In order to promote understanding, illustrated is a simple example in which materials other than the negative electrode active material 3d and the gel powder 11a are omitted from the negative electrode active material-containing layer 3b, and the negative electrode active material-containing layer 3b is provided only on one surface of the negative electrode current collector 3a. The gel powder 11a may be, for example, a powder sample obtained by agglomerating a chemical gel with an organic solvent and then drying the chemical gel.

By applying a negative electrode material slurry containing the negative electrode active material 3d and the gel powder 11a onto the negative electrode current collector 3a, and drying the slurry, it is possible to obtain the negative electrode active material-containing layer 3b containing the gel powder 11a as well as the negative electrode active material 3d as illustrated in FIG. 2. The negative electrode active material-containing layer 3b on the negative electrode current collector 3a may be rolled, as appropriate.

The first aqueous electrolyte is introduced into the negative electrode active material-containing layer 3b by pouring the first aqueous electrolyte or immersing the entire structure in the first aqueous electrolyte, and thereby the gel powder 11a is swollen with the first aqueous electrolyte. Accordingly, the gel powder 11a can be turned into the first hydrogel electrolyte 11. In this manner, not only can a front surface of the negative electrode 3 be covered with the first hydrogel electrolyte 11, but the first hydrogel electrolyte can be contained in the negative electrode active material-containing layer 3b, as well.

When a sheet-shaped or film-shaped hydrogel electrolyte is disposed, a part of the hydrogel electrolyte may be arranged to be pinched or sandwiched by a container member, or tucked into parts of the container member. In this manner, it is possible to prevent the electrolyte from moving away from a space between the container member and an outer periphery of the sheet-shaped or film-shaped hydrogel electrolyte.

The secondary battery according to the embodiment may further include a separator disposed between the positive electrode and the negative electrode. In such a case, at least a part of the separator is present between the positive electrode and the negative electrode. The positive electrode, the negative electrode, and the separator may configure an electrode group. There may also be configured an electrode group with the separator omitted. The secondary battery may further include a container member capable of housing the electrode group and the aqueous electrolyte.

In addition, the secondary battery may further include a negative electrode terminal electrically connected to the negative electrode and a positive electrode terminal electrically connected to the positive electrode.

The secondary battery according to the embodiment is a rechargeable storage battery in which a carrier ion (for example, a lithium ion) moves back and forth between the positive electrode and the negative electrode, whereby electric power can be charged and discharged. More specifically, the secondary battery is a secondary battery in which charge and discharge are performed by a carrier ion being inserted into/extracted from an electrode active material at each of the positive electrode and the negative electrode. The secondary battery according to the embodiment differs from an electrochemical cell for sample measurement, a fuel cell, or the like and may be a lithium ion secondary battery, a sodium ion secondary battery, or a magnesium secondary battery, for example.

Hereinafter, the hydrogel electrolyte, the aqueous electrolyte, the negative electrode, the positive electrode, the separator, the container member, the negative electrode terminal, and the positive electrode terminal will be described in detail.

(1) Hydrogel Electrolyte

The hydrogel electrolyte contains the chemically cross-linked gel, that is, the chemical gel. The hydrogel electrolyte may contain the aqueous electrolyte in a state of retaining the aqueous electrolyte in the chemical gel. The hydrogel electrolyte may include the first hydrogel electrolyte that retains at least a part of the first aqueous electrolyte. At least a part of the first hydrogel electrolyte overlaps at least a part of the negative electrode. The hydrogel electrolyte may include the second hydrogel electrolyte that retains at least a part of the second aqueous electrolyte. At least a part of the second hydrogel electrolyte overlaps at least a part of the positive electrode. There is no limitation to the form of the overlapping of the first hydrogel electrolyte with the negative electrode and the overlapping of the second hydrogel electrolyte with the positive electrode in the same manner as with the "overlapping" described above, such as covering of the target electrode with the corresponding hydrogel electrolyte, wrapping of the corresponding hydrogel electrolyte around the target electrode, or the like.

Although the chemical gel contained in the hydrogel electrolyte will be described below, details of the chemical gel are independently applied with respect to each of the first hydrogel electrolyte and the second hydrogel electrolyte, unless otherwise specified. For example, in a case using both the first hydrogel electrolyte and the second hydrogel electrolyte in one secondary battery, the contained chemical gel may be the same or different between the first hydrogel electrolyte and the second hydrogel electrolyte. In a case of using both the first hydrogel electrolyte and the second hydrogel electrolyte, the first electrolyte composition of the first aqueous electrolyte that may swell the chemical gel in the first hydrogel electrolyte is different from the second electrolyte composition of the second aqueous electrolyte that may swell the chemical gel in the second hydrogel electrolyte.

As a material configuring the gel, for example, a polysaccharide exhibiting water-solubility can be favorably used. By adding a crosslinking agent thereto, the chemical gel can be obtained. Incidentally, gelling reaction proceeds at room temperature, and thus, heating is unnecessary.

Examples of the polysaccharide exhibiting water-solubility include gellan gum, guar gum, cellulose, carrageenan, starch, pectin, xanthan gum, pullulan, alginic acid, tamarind seed gum, tamarind gum, gum arabic, locust bean gum, a derivative such as an acetylated derivative thereof and a propylated derivative thereof, or the like. As the polysaccharide used in the gel, one of, or two or more of the polysaccharides described above may be used.

As the number of carboxylic acid groups contained within a molecule is greater, water-solubility of the polysaccharide is higher. On the other hand, when the number of carboxylic acid groups contained in a molecule is greater, it is easier to obtain a stable three-dimensional structure. It is preferable to use a polysaccharide having a certain number or more of each of carboxylic acid groups and hydroxyl groups within a single molecule. For example, gellan gum contains a large number of both the carboxylic acid groups and the hydroxyl groups in one molecule and thus can be favorably used.

In addition, as a crosslinking agent used for crosslinking the polysaccharides described above to obtain a gel, it is possible to use any compound, as long as the compound has plural functional groups having reactivity with hydroxyl groups of the polysaccharide in a molecule. From the viewpoint of reactivity, one or more selected from the group consisting of epoxy compounds and isocyanate compounds can be favorably used.

Examples of the epoxy compounds include a diepoxy compound such as ethylene glycol diglycidyl ether, propylene glycol diglycidyl ether, diethylene glycol diglycidyl ether, polyethylene glycol diglycidyl ether, polypropylene glycol diglycidyl ether, neopentyl glycol diglycidyl ether, 1,6-hexanediol diglycidyl ether, hydrogenated bisphenol A diglycidyl ether, glycerin novlycidyl ether; a triepoxy compound such as glycerin triglycidyl ether, trimethylolpropane triglycidyl ether, triglycidyl isocyanurate; a polyepoxy compound such as glycerol polyglycidyl ether, trimethylolpropane polyglycidyl ether, pentaerythritol polyglycidyl ether, sorbitol polyglycidyl ether; or the like. One of, or two or more of the epoxy compounds described above may be used.

Examples of the isocyanate compound include diethylene diisocyanate, tetramethylene diisocyanate, pentamethylene diisocyanate, hexamethylene diisocyanate, 1,3-bis(isocyanatomethyl) benzene, 1,4-bis(diisocyanatomethyl) benzene, 2,4-tolylene diisocyanate, 2,6-tolylene diisocyanate, diphenylmethane diisocyanate, naphthalene diisocyanate, isophorone diisocyanate, an alicyclic compound obtained by adding hydrogen to the above diisocyanate compound, or the like. One of, or two or more of the isocyanate compounds described above may be used.

It is also possible to form a physical gel by using the polysaccharides such as gellan gum described above. However, in terms of durability, it is desirable to use the chemical gel obtained by chemically bonding with the crosslinking agent, that is, a gel having a structure chemically crosslinked through covalent bonding. The chemical gel does not undergo compositional changes and liquefy even under high temperature conditions or when a solvent amount becomes great, and can therefore maintain elasticity. Compositional change occurs readily in the physical gel, and therefore, the physical gel is apt to lose elasticity and change into a liquid.

(2) Aqueous Electrolyte

The aqueous electrolyte may include a first aqueous electrolyte and a second aqueous electrolyte. While the aqueous electrolyte is described below, the description of the aqueous electrolyte is independently applied with respect to each of the first aqueous electrolyte and the second aqueous electrolyte, unless otherwise specified.

The aqueous electrolyte contains an aqueous solvent and an electrolyte salt. The first aqueous electrolyte contains the first solvent as the aqueous solvent and the first electrolyte salt as the electrolyte salt. Similarly, the second aqueous electrolyte contains the second solvent as the aqueous solvent and the second electrolyte salt as the electrolyte salt. Unless otherwise specified in the following description, the detailed description of the aqueous solvent is independently applied with respect to each of the first solvent and the second solvent. Similarly, unless otherwise specified, the detailed description of the electrolyte salt is independently applied with respect to each of the first electrolyte salt and the second electrolyte salt.

As the electrolyte salt, there may be used, for example, a lithium salt, a sodium salt, or a mixture thereof. One species, or two species or more of sodium salts may be used.

There may be used as the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI; $LiN(SO_2CF_3)_2$), lithium bis(fluorosulfonyl)imide (LiFSI; $LiN(SO_2F)_2$), lithium bis(oxalate)borate (LiBOB; $LiB[(OCO)_2]_2$), or the like.

There may be used as the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like.

As the electrolyte salt, an inorganic salt is preferably used. Examples of lithium salt which is the inorganic salt include LiCl, LiBr, LiOH, $Li_2SO_4$, and $LiNO_3$. Examples of the sodium salt which is the inorganic salt include NaCl, $Na_2SO_4$, NaOH, and $NaNO_3$. The aqueous electrolyte containing the inorganic salt as the electrolyte salt at high concentration does not freeze even at a low temperature of about −60° C., and thus it is possible to widen a use environment in which the secondary battery can be used.

As the lithium salt, LiCl is preferably contained. When LiCl is used, the lithium ion concentration of the aqueous electrolyte can be made high. Additionally, the lithium salt preferably contains at least one of $Li_2SO_4$ and LiOH in addition to LiCl.

The mol concentration of carrier ions (e.g., lithium ions or sodium ions) in the aqueous electrolyte is preferably 3 mol/L or more, more preferably 6 mol/L or more, and further preferably 12 mol/L or more. When the concentration of the carrier ions in the aqueous electrolyte is high, electrolysis of the aqueous solvent at the negative electrode can easily be suppressed, and hydrogen generation from the negative electrode tends to be little.

In the aqueous electrolyte, the aqueous solvent amount is preferably 1 mol or more relative to 1 mol of electrolyte salt serving as a solute. In a more preferable form, the aqueous solvent amount relative to 1 mol of the salt serving as a solute is 3.5 mol or more.

The aqueous electrolyte preferably contains, as an anion species, at least one selected from the group consisting of a chloride ion ($Cl^-$), a hydroxide ion ($OH^-$), a sulfate ion ($SO_4^{2-}$), and a nitrate ion ($NO_3^-$).

The pH of the aqueous electrolyte is preferably 3 to 14, and more preferably 4 to 13.

In addition, in the secondary battery after initial charge, the pH of the first aqueous electrolyte and the second aqueous electrolyte are preferably different. In the secondary battery after the initial charge, the pH of the first aqueous electrolyte on the negative electrode side is preferably 3 or more, more preferably 5 or more, and further preferably 7 or more. In the secondary battery after the initial charge, the pH of the second aqueous electrolyte on the positive electrode side preferably falls within the range of 0 to 7, and more preferably falls within the range of 0 to 6.

A hydrogen generation potential at the negative electrode depends on a pH of the first aqueous electrolyte. When the pH of the first aqueous electrolyte which is in contact with the negative electrode becomes high, the hydrogen generation potential of the negative electrode lowers. Hence, when the pH of the first aqueous electrolyte after the initial charge is within the range described above, decomposition of water at the negative electrode is less likely to occur. On the other hand, in the second aqueous electrolyte at the positive electrode side, generation of oxygen can be suppressed by lowering the pH.

The pH of the first aqueous electrolyte and the pH of the second aqueous electrolyte can be obtained, for example, by disassembling the secondary battery and measuring the pH of each of the aqueous electrolytes separated by the hydrogel electrolyte to the negative electrode side and positive electrode side.

As the aqueous solvent, a solution including water may be used. Here the solution including water may be pure water or a solvent mixture of water and an organic solvent. The aqueous solvent may include water at a proportion of 50% or more by volume, for example.

The containing of water in the aqueous electrolyte can be examined by GC-MS (Gas Chromatography-Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

(3) Negative Electrode

The negative electrode may include a negative electrode current collector, and a negative electrode active material-containing layer supported on one face or both of reverse faces of the negative electrode current collector.

There may be used as material for the negative electrode current collector, a substance which is electrochemically stable at the negative electrode potential range when alkali metal ions are inserted and extracted. The negative electrode current collector is preferably a foil made of a metal, such as nickel, stainless steel, iron, copper, zinc, titanium, and the like, an aluminum foil, or an aluminum alloy foil containing at least one selected from the group consisting of magnesium (Mg), titanium (Ti), zinc (Zn), manganese (Mn), iron (Fe), copper (Cu), and silicon (Si). The negative electrode current collector may be of another form such as a porous body or a mesh. The thickness of the negative electrode current collector is preferably 5 μm to 50 μm. With a current collector having such a thickness, balance can be kept between the strength of the electrode and weight reduction.

The negative electrode current collector may include a portion where the negative electrode active material-containing layer is not formed on a surface thereof. This portion may serve as a negative electrode current collecting tab.

The negative electrode active material-containing layer contains a negative electrode active material. The negative electrode active material-containing layer may be supported on at least one face of the negative electrode current collector. For example, the negative electrode active material-containing layer may be disposed on one face of the negative electrode current collector, or the negative electrode active material-containing layer may be disposed on one face and a reverse face of the negative electrode current collector.

The porosity of the negative electrode active material-containing layer is preferably 20% to 50%. In this range, the negative electrode both excellent in affinity with the electrolyte and is of high density can be obtained. The porosity of the negative electrode active material-containing layer is more preferably 25%, to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

As the negative electrode active material, there may be used a compound whose lithium ion insertion/extraction potential is 1 V (vs. Li/Li$^+$) to 3 V (vs. Li/Li$^+$) in terms of a potential based on metal lithium (a potential with respect to an oxidation-reduction potential of lithium). In the secondary battery according to the embodiment, there can be used the first aqueous electrolyte having the first electrolyte composition with which the hydrogen generation potential at the negative electrode is lowered. Hence, there can be used as the negative electrode active material of the secondary battery, a compound with a relatively low lower limit value of lithium ion insertion/extraction potential. When such a negative electrode active material is used, the energy density of the secondary battery can be raised. For this reason, the secondary battery can accomplish the same energy density as that of a battery using a nonaqueous electrolyte.

As the negative electrode active material, more specifically, an oxide of titanium or a titanium-containing oxide may be used. As the titanium-containing oxide, a lithium titanium composite oxide, a niobium titanium composite oxide, a sodium titanium composite oxide, an orthorhombic titanium-containing oxide, and the like may be used. One species or two species or more of the oxide of titanium and the titanium-containing oxides may be included in the negative electrode active material.

The oxide of titanium includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$. Here, x satisfies $0 \leq x \leq 1$. In addition, the structure of titanium oxide having a monoclinic structure before charge can be expressed as $TiO_2(B)$.

The lithium titanium oxide includes, for example, a lithium titanium oxide having a spinel structure (for example, a compound represented by general formula $Li_{4+w}Ti_5O_{12}$, where $-1 \leq w \leq 3$), a lithium titanium oxide having a ramsdellite structure (for example, a compound represented by $Li_{2+w}Ti_3O_7$, where $-1 \leq w \leq 3$), a compound represented by $Li_{1+x}Ti_2O_4$ where $0 \leq x \leq 1$, a compound represented by $Li_{1.1+x}Ti_{1.8}O_4$ where $0 \leq x \leq 1$, a compound represented by $Li_{1.07+x}Ti_{1.86}O_4$ where $0 \leq x \leq 1$, a compound represented by $Li_vTiO_2$ where $0 < v \leq 1$), and the like. The lithium titanium oxide may be a lithium titanium composite oxide having a dopant introduced.

The niobium titanium composite oxide include, for example, a compound represented as $Li_yTiM_zNb_{2\pm\beta}O_{7\pm\sigma}$, where $0 \leq y \leq 5$, $0 \leq z \leq 0.3$, $0 \leq \beta \leq 0.3$, $0 \leq \sigma \leq 0.3$, and M is at least one selected from the group consisting of Fe, V, Mo, and Ta.

The sodium titanium composite oxide include, for example, an orthorhombic Na-containing niobium titanium composite oxide represented by the general formula $Li_{2+a}Na_{2-b}M1_cTi_{6-d-e}Nb_dM2_eO_{14+\delta}$, where $0 \leq a \leq 4$, $0 \leq b < 2$, $0 \leq c < 2$, $0 < d < 6$, $0 \leq e < 3$, $-0.5 \leq \delta \leq 0.5$, M1 includes at least one selected from the group consisting of Cs, K, Sr, Ba, and Ca, and M2 includes at least one selected from the group consisting of Zr, Sn, V, Ta, Mo, W, Fe, Co, Mn, and Al.

The orthorhombic titanium-containing composite oxide include, for example, a compound represented by $Li_{2+f}M\alpha_{2-g}Ti_{6-h}M\beta_jO_{14+\delta}$. Here, $M\alpha$ is at least one selected from the group consisting of Sr, Ba, Ca, Mg, Na, Cs, Rb and K. $M\beta$ is at least one selected from the group consisting of Zr, Sn, V, Nb, Ta, Mo, W, Y, Fe, Co, Cr, Mn, Ni and Al. The respective subscripts in the composition formula are specified as follows: $0 \leq f \leq 6$, $0 \leq g < 2$, $0 \leq h < 6$, $0 \leq j < 6$, and $-0.5 \leq \delta \leq 0.5$. Specific examples of the orthorhombic titanium-containing composite oxide include $Li_{2+f}Na_2Ti_6O_{14}$, where $0 \leq f \leq 6$.

As the negative electrode active material, the titanium oxide having the anatase structure, the titanium oxide having the monoclinic structure, the lithium titanium oxide having the spinel structure, or a mixture thereof is preferably used. When one of these oxides is used as the negative electrode active material and, for example, a lithium manganese composite oxide is used as the positive electrode active material, a high electromotive force can be obtained.

The negative electrode active material may be contained in the negative electrode active material-containing layer in a form of, for example, particles. The negative electrode active material particles may be primary particles, secondary particles that are agglomerates of primary particles, or a mixture of singular primary particles and secondary particles. The shape of a particle is not particularly limited and may be, for example, spherical, elliptical, flat, or fibrous.

The average particle size (diameter) of the primary particles of the negative electrode active material is preferably 3 μm or less, and more preferably 0.01 μm to 1 μm. The average particle size (diameter) of the secondary particles of the negative electrode active material is preferably 30 μm or less, and more preferably 5 μm to 20 μm.

Each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles by N-methyl-2-pyrrolidone such that the concentration becomes 0.1 mass % to 1 mass % is used. Alternatively, used is a measurement sample obtained by dispersing 0.1 g of a negative electrode active material in 1 ml to 2 ml of distilled water containing a surfactant.

The negative electrode active material-containing layer may contain an electro-conductive agent, a binder, and the like in addition to the negative electrode active material. The electro-conductive agent is mixed as needed to raise current collection performance and suppress the contact resistance between the active material and the current collector. The binder has a function of binding the active material, the electro-conductive agent, and the current collector.

Examples of the electro-conductive agent include carbonaceous materials such as acetylene black, Ketjen black, graphite, and coke. The electro-conductive agent may be of one species, or two species or more may be used in mixture.

As the binder for the negative electrode, there may be used, for example, at least one selected from the group consisting of polytetrafluoroethylene (PTFE), polyvinylidene fluoride (PVdF), a cellulose-based polymer such as carboxymethyl cellulose (CMC), fluorine-based rubber, styrene butadiene rubber, an acrylic resin or a copolymer thereof, polyacrylic acid, and polyacrylonitrile (PAI). The binder is not limited to the above. The binder may be of one species, or two or more species may be used in mixture.

The mixing ratios of the electro-conductive agent and binder with respect to 100 parts by mass of active material in the negative electrode active material-containing layer are preferably 1 part by mass to 20 parts by mass and 0.1 part by mass to 10 parts by mass, respectively. If the mixing ratio of the electro-conductive agent is 1 part by mass or more, the electrical conductivity of the negative electrode can be favorable. If the mixing ratio of the electro-conductive agent is 20 parts by mass or less, decomposition of the aqueous electrolyte on the electro-conductive agent surface can be reduced. If the mixing ratio of the binder is 0.1 part by mass or more, a sufficient electrode strength can be obtained. If the mixing ratio of the binder is 10 parts by mass or less, the insulating portions in the electrode can be decreased.

More preferably, the negative electrode contains zinc. Zinc may be present on the surface of the negative electrode active material as metallic zinc (elemental zinc) or a compound of zinc (for example, zinc oxide or zinc hydroxide). Also, as the current collector of the negative electrode, a material containing zinc such as zinc foil or a zinc-containing alloy may be used. Zinc present on the surface of the negative electrode active material may be, for example, zinc eluted from a zinc-including current collector that then deposited onto the negative electrode at the time of initial charge when the current collector including zinc is used for the negative electrode. Zinc contained in the negative electrode raises the hydrogen generation overvoltage at the negative electrode. Therefore, an effect of suppressing hydrogen generation is further obtained.

The negative electrode can be obtained by, for example, the following method. First, the active material, electro-conductive agent, and binder are suspended in a suitable solvent to prepare a slurry. Next, the slurry is applied onto one surface or both surfaces of the current collector. The coating of applied slurry on the current collector is dried, thereby forming an active material-containing layer. After that, pressing is performed for the current collector and the active material-containing layer formed thereon. As the active material-containing layer, the mixture of the active material, electro-conductive agent, and binder may be formed into pellets and used.

(4) Positive Electrode

The positive electrode may include a positive electrode current collector and a positive electrode active material-containing layer supported on at least one principal surface of the positive electrode current collector.

The positive electrode current collector contains, for example, an alloy such as stainless steel, and metals such as aluminum (Al) and titanium (Ti). The positive electrode current collector may have a form of, for example, a foil, a porous body, or a mesh. The surface of the positive electrode current collector may be covered with a different element in order to prevent corrosion by the reaction between the positive electrode current collector and the aqueous electrolyte. The positive electrode current collector is preferably a material with excellent corrosion resistance and oxidation resistance such as Ti foil and the like, for example. Note that when $Li_2SO_4$ is used as the second aqueous electrolyte, since corrosion does not progress, Al may be used as the positive electrode current collector.

The positive electrode active material-containing layer contains a positive electrode active material. The positive electrode active material-containing layer may be supported on both of reverse principal surfaces of the positive electrode current collector.

As the positive electrode active material, there may be used a compound whose lithium ion insertion/extraction potential is 2.5 V (vs. Li/Li$^+$) to 5.5 V (vs. Li/Li$^+$) in terms of a potential based on metal lithium (a potential with respect to an oxidation-reduction potential of lithium). The positive electrode may contain one species of positive electrode active material or may contain two or more species of positive electrode active materials.

Examples of the positive electrode active material include a lithium manganese composite oxide, a lithium nickel composite oxide, a lithium cobalt aluminum composite oxide, a lithium nickel cobalt manganese composite oxide, a spinel lithium manganese nickel composite oxide, a lithium manganese cobalt composite oxide, lithium iron oxide, lithium iron fluorosulfate, a phosphate compound having an olivine crystal structure (for example, a compound represented by $Li_vFePO_4$ where $0<v\leq1$, or a compound represented by $Li_vMnPO_4$ where $0<v\leq1$), and the like. The phosphate compound having an olivine crystal structure has excellent thermal stability.

Examples of the positive electrode active material with which a high positive electrode potential can be obtained include a lithium manganese composite oxide such as a compound having a spinel structure represented by $Li_vMn_2O_4$ where $0<v\leq1$, and a compound represented by $Li_vMnO_2$ where $0<v\leq1$; a lithium nickel aluminum composite oxide such as a compound represented by $Li_vNi_{1-u}Al_uO_2$ where $0<v\leq1$ and $0<u\leq1$; a lithium cobalt composite oxide such as a compound represented by $Li_vCoO_2$ where $0<v\leq1$; a lithium nickel cobalt composite oxide such as a compound represented by $Li_vNi_{1-u-t}Co_uMn_tO_2$ where $0<v\leq1$, $0<u<1$, and $0\leq t<1$; a lithium manganese cobalt composite oxide such as a compound represented by $Li_vMn_uCo_{1-u}O_2$ where $0<v\leq1$ and $0<u<1$; a spinel lithium manganese nickel composite oxide such as a compound represented by $Li_vMn_{1-r}Ni_rO_4$ where $0<v\leq1$, $0<r<2$, and $0<1-r<1$; a lithium phosphate having an olivine structure such as a compound represented by $Li_vFePO_4$ where $0<v\leq1$, a compound represented by $Li_vFe_{1-x}Mn_xPO_4$ where $0<v\leq1$ and $0\leq x\leq1$, and a compound represented by $Li_vCoPO_4$ where $0<v\leq1$, and an iron fluorosulfate (for example, a compound represented by $Li_vFeSO_4F$ where $0<v\leq1$).

The positive electrode active material preferably includes at least one selected from the group consisting of the lithium cobalt composite oxide, the lithium manganese composite oxide, and the lithium phosphate having the olivine structure. The operating potentials of these active materials are 3.5 V (vs. Li/Li$^+$) to 4.2 V (vs. Li/Li$^+$). Namely, the operating potentials of these active materials are relatively high. When these positive electrode active materials are used in combination with the above described negative electrode active material such as the spinel lithium titanate or the anatase titanium oxide, a high battery voltage can be obtained.

The positive electrode active material may be contained in the positive electrode in a form of, for example, particles. The positive electrode active material particles may be single primary particles, secondary particles that are agglomerates of primary particles, or a mixture of primary particles and secondary particles. The shape of a particle is not particularly limited and may be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm.

The primary particle size and the secondary particle size of the positive electrode active material can be measured by the same method as that for the negative electrode active material particles.

The positive electrode active material-containing layer may contain an electro-conductive agent, a binder, and the like in addition to the positive electrode active material. The electro-conductive agent is mixed as needed to raise current collection performance and suppress the contact resistance between the active material and the current collector. The binder has a function of binding the active material, the electro-conductive agent, and the current collector.

Examples of the electro-conductive agent include carbonaceous materials such as acetylene black, Ketjen black, graphite, and coke. The electro-conductive agent may be of one species, or two species or more may be used in mixture.

As the binder, there may be used, for example, polytetrafluoroethylene (PTFE), polyvinylidene fluoride (PVdF), fluorine-based rubber, ethylene-butadiene rubber, polypropylene (PP), polyethylene (PE), carboxymethyl cellulose (CMC), polyimide (PI), polyacrylimide (PAI), or the like. The binder may be of one species, or two species or more may be used in mixture.

The mixing ratios of the electro-conductive agent and binder with respect to 100 parts by mass of active material in the positive electrode active material-containing layer are preferably 0.1 part by mass to 20 parts by mass and 0.5 part by mass to 10 parts by mass, respectively. If the mixing ratio of the electro-conductive agent is 0.1 parts by mass or more, the electrical conductivity of the positive electrode can be favorable. If the mixing ratio of the electro-conductive agent is 20 parts by mass or less, decomposition of the aqueous electrolyte on the electro-conductive agent surface can be reduced. If the mixing ratio of the binder is 0.5 part by mass or more, a sufficient electrode strength can be obtained. If the mixing ratio of the binder is 10 parts by mass or less, the insulating portions in the electrode can be decreased.

The positive electrode can be obtained by, for example, the following method. First, the active material, electro-conductive agent, and binder are suspended in a suitable solvent to prepare a slurry. Next, the slurry is applied onto one surface or both surfaces of the current collector. The coating of applied slurry on the current collector is dried, thereby forming an active material-containing layer. After that, pressing is performed for the current collector and the active material-containing layer formed thereon. As the active material-containing layer, the mixture of the active material, electro-conductive agent, and binder may be formed into pellets and used.

(5) Separator

The separator may be disposed between the positive electrode and the negative electrode. By configuring the separator using electrically insulating materials, the positive and negative electrodes can be prevented from coming into electrical contact. It is desirable to use a separator having a shape which allows the electrolyte to move within the separator.

Examples of the separator include non-woven fabrics, films, and paper. Examples of a constituent material of the separator include polyolefin such as polyethylene and polypropylene; and cellulose. Preferable examples of the separator include cellulose fiber-containing non-woven fabrics and polyolefin fiber-containing porous films.

The porosity of the separator is preferably 60% or more. In separators that contain fibers, the fiber diameter is preferably 10 μm or less. When the fiber diameter is set to 10 μm or less, the affinity of the electrolyte with the separator is improved, thereby reducing the battery resistance. The fiber diameter is more preferably 3 μm or less. A cellulose fiber-containing non-woven fabric having a porosity of 60% or more has an excellent electrolyte impregnation property, and thus, allows a high output performance to be exerted over a range of from low to high temperatures. Further, such a separator does not react with the negative electrode, even during long-term storage in a charged state, float charge or over-charge, and therefore, there does not occur a short circuit between the negative electrode and the positive electrode due to the formation of lithium metal dendrites. The porosity of the separator is more preferably from 62% to 80%.

It is preferable that the separator has a thickness of from 20 μm to 100 μm and a density of from 0.2 g/cm³ to 0.9 g/cm³. When the thickness and the density of the separator are respectively within the above ranges, balance can be maintained between the mechanical strength and a reduction in battery resistance, whereby there can be provided a secondary battery which has a high output and where there is suppression in occurrence of internal short circuits. In addition, there is little thermal shrinkage of the separator at high temperatures, and thus, a favorable high-temperature storage performance can be attained.

In addition, it is possible to use a solid electrolyte layer containing solid electrolyte particles, as the separator. The solid electrolyte layer may contain one species of solid electrolyte particles or may contain plural species of solid electrolyte particles. The solid electrolyte layer may be a solid electrolyte composite film containing the solid electrolyte particles. For example, the solid electrolyte composite film is obtained by molding the solid electrolyte particles into a film shape using a polymeric binder. The solid electrolyte layer may contain at least one selected from the group consisting of a plasticizing agent and an electrolyte salt. When the solid electrolyte layer contains an electrolyte salt, for example, the alkali metal ion conductivity of the solid electrolyte layer can further be raised.

Examples of the polymeric binder include a polyvinyl-based binder, a polyether-based binder, a polyester-based binder, a polyamine-based binder, a polyethylene-based binder, a silicone-based binder, and a polysulfide-based binder.

As a solid electrolyte, an inorganic solid electrolyte is preferably used. Examples of the inorganic solid electrolyte include an oxide-based solid electrolyte and a sulfide-based solid electrolyte. As the oxide-based solid electrolyte, a lithium phosphate solid electrolyte having a NASICON structure and represented by a general formula of $LiMe_2(PO_4)_3$ is preferably used. Me in the formula described above is preferably one or more selected from the group consisting of titanium (Ti), germanium (Ge), strontium (Sr), zirconium (Zr), tin (Sn), and aluminum (Al). The element Me preferably includes Al and one among Ge, Zr, and Ti.

Specific examples of the lithium phosphate solid electrolyte having the NASICON structure include LATP($Li_{1+k}Al_kTi_{2-k}(PO_4)_3$), $Li_{1+k}Al_kGe_{2-k}(PO_4)_3$, and $Li_{1+k}Al_kZr_{2-k}(PO_4)_3$. In the formulae described above, k falls within the range of 0<k≤5, and preferably falls within the range of 0.1≤k≤0.5. As the solid electrolyte, LATP is preferably used. LATP is excellent in water resistance and is unlikely to undergo hydrolysis within the secondary battery.

In addition, as the oxide-based solid electrolyte, an amorphous LIPON (for example, $Li_{2.9}PO_{3.3}N_{0.46}$) or LLZ (for example, $Li_7La_3Zr_2O_{12}$) having a garnet structure may be used.

In addition, as the solid electrolyte, a sodium-containing solid electrolyte may be used. The sodium-containing solid electrolyte is excellent in the ionic conductivity of sodium ions. Examples of the sodium-containing solid electrolyte include β-alumina, sodium phosphorus sulfides, sodium phosphates, and the like. The sodium ion-containing solid electrolyte is preferably in a form of glass ceramics.

As the electrolyte salt which may be contained in the solid electrolyte layer, the lithium salt or sodium salt that may be contained in the aqueous electrolyte may be used.

The proportion of the electrolyte salt in the solid electrolyte layer is preferably from 0.01% by mass to 10% by mass, and more preferably from 0.05% by mass to 5% by mass. The proportion of the electrolyte salt in the solid electrolyte layer can be calculated by thermogravimetric (TG) analysis.

Whether the solid electrolyte layer contains an electrolyte salt can be examined, for example, based on an alkali metal ion distribution obtained by energy dispersive X-ray spectrometry (EDX) for a section of the solid electrolyte layer. That is, if the solid electrolyte layer is made of a material that does not contain an electrolyte salt, the alkali metal ions remain at the surface of the polymeric material in the solid electrolyte layer, and therefore, are scarcely present inside the solid electrolyte layer. Hence, there may be observed a concentration gradient where the concentration of alkali metal ions is high at the surface of the solid electrolyte layer, while the concentration of alkali metal ions is low inside the solid electrolyte layer. On the other hand, if the solid electrolyte layer is made of a material containing an electrolyte salt, it would be confirmed that the alkali metal ions are evenly present within the solid electrolyte layer, to the extent of the interior.

Conversely, if the electrolyte salt contained in the solid electrolyte layer and the electrolyte salt contained in the aqueous electrolyte are of different species, based on the difference in ions that are present, it can be found that the solid electrolyte layer contains an electrolyte salt different from that in the aqueous electrolyte. For example, when lithium chloride (LiCl) is used for the aqueous electrolyte, and LiTFSI (lithium bis(fluorosulfonyl)imide) is used for the solid electrolyte layer, the presence of (fluorosulfonyl)imide ions would be confirmed in the solid electrolyte layer. On the other hand, in the aqueous electrolyte, the presence of the (fluorosulfonyl)imide ions would not be confirmed, or the (fluorosulfonyl)imide ions would be present at an exceptionally low concentration.

The separator may have an air-permeability coefficient of $1 \times 10^{-13}$ m$^2$ or less. For example, the nonwoven fabric containing cellulose fiber has an air-permeability coefficient of about $5 \times 10^{-14}$ m$^2$. The solid electrolyte composite film may have an air-permeability coefficient of $1 \times 10^{-16}$ m$^2$ or less; for example, the air-permeability coefficient may be $1 \times 10^{-17}$ m$^2$. By using a separator having a low air-permeability coefficient, the first electrolyte and the second electrolyte can be further suppressed from flowing together and becoming mixed.

An air-permeability coefficient KT (m$^2$) of the separator can be calculated as follows. In calculation of the air-permeability coefficient KT, for example, in a case where a separator having a thickness L (m) is a measurement target, a gas having a viscosity constant σ (Pa·s) is permeated through the separator within a range of a measurement area A (m$^2$). Here, the gas is permeated through the separator using plural conditions respectively having different pressures p (Pa) of the gas that is input, and an amount Q (m$^3$/s) of gas that had permeated through the separator is measured in each of the plural conditions. Then, from measurement results, amounts Q of air with respect to the pressure p are plotted, and dQ/dp which is a slope thereof is obtained. Thereafter, the air-permeability coefficient KT is calculated as in Equation (1) from the thickness L, the measurement area A, the viscosity constant σ, and the slop dQ/dp:

$$KT = ((\sigma \cdot L)/A) \times (dQ/dp) \tag{1}$$

In a certain example of a method of calculating the air-permeability coefficient KT, the separator is sandwiched between a pair of stainless steel plates each having a hole with a diameter of 10 mm opened therein. Air is transferred in from the hole in one stainless steel plate at the pressure p, and the amount Q of air leaking out from the hole in the other stainless steel plate is measured. Hence, an area (25π mm$^2$) of the hole is used as the measurement area A, and 0.000018 Pa·s is used as the viscosity constant σ. In addition, the amount Q of gas (air) is calculated by measuring an amount δ (m$^3$) of air leaking out from the hole during a span of 100 seconds and dividing the measured amount δ by 100.

The amount Q of gas with respect to the pressure p is measured as described above, for four points which vary by pressure p of at least 1,000 Pa from each other. For example, the amount Q of gas with respect to the pressure p is measured, for each of four points at which the pressure p is 1,000 Pa, 2,500 Pa, 4,000 Pa, and 6,000 Pa. Then, the measured amounts Q of gas with respect to the pressure p for the four points are plotted, and a slope (dQ/dp) of the amount Q of gas with respect to the pressure p is calculated by straight line fitting (least square method). Hence, the air-permeability coefficient KT is calculated by multiplying (σ·L)/A to the calculated slope (dQ/dp).

Incidentally, in the measurement of the air-permeability coefficient of the separator, the separator is disassembled from a battery and is separated from other components of the battery. After both surfaces of the separator are washed with pure water, the separator is immersed in pure water and is left standing for 48 hours or more. Then, both surfaces are further washed with pure water, and after the separator is dried in a vacuum drying oven at 100° C. for 48 hours or more, the air-permeability coefficient is measured. In addition, the air-permeability coefficient is measured at plural arbitrary positions on the separator. Then, a value at the position among the plural positions, at which the measured air-permeability coefficient is lowest, is taken as the air-permeability coefficient of the separator.

(6) Container Member

As the container member that houses the positive electrode, the negative electrode, the first electrolyte, the second electrolyte, and the hydrogel electrolyte, a metal container, a laminated film container, or a resin container may be used.

As the metal container, a metal can made of nickel, iron, stainless steel, or the like and having an angular shape or a cylindrical shape may be used. As the resin container, a container made of polyethylene, polypropylene, or the like may be used.

The plate thickness of each of the resin container and the metal container preferably falls within the range of 0.05 mm to 1 mm. The plate thickness is more preferably 0.5 mm or less, and even more preferably 0.3 mm or less.

As the laminated film, for example, a multilayered film formed by covering a metal layer with resin layers may be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. The thickness of the laminated film preferably falls within the range of 0.01 mm to 0.5 mm. The thickness of the laminated film is more preferably 0.2 mm or less.

(7) Negative Electrode Terminal

The negative electrode terminal may be formed, for example, from a material that is electrochemically stable at the potential of alkali metal ion insertion/extraction of the negative active material and has electrical conductivity. Specifically, the material for the negative electrode terminal may include zinc, copper, nickel, stainless steel, aluminum, or an aluminum alloy containing at least one selected from the group consisting of Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(8) Positive Electrode Terminal

The positive electrode terminal is made, for example, of a material that is electrically stable in a potential range of 3 V to 4.5 V with respect to oxidation-reduction potential of lithium (vs. Li/Li$^+$) and has electrical conductivity. Examples of the material for the positive electrode terminal include titanium, aluminum, or an aluminum alloy containing at least one selected from a group consisting of Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

An example of the secondary battery according to the examples will be described below, with reference to the drawings.

FIG. 4 is a sectional view schematically showing an example of the secondary battery according to the embodiment. FIG. 5 is a sectional view schematically showing another example of the secondary battery according to the embodiment.

The secondary battery 100 shown in FIG. 4 includes a negative electrode 3 that includes a negative electrode current collector 3a and a negative electrode active material-containing layer 3b, a positive electrode 5 that includes a positive electrode current collector 5a and a positive electrode active material-containing layer 5b, a first hydrogen electrolyte 11 in contact with the negative electrode 3, a second electrolyte 12 in contact with the positive electrode 5, and a container member 2. The negative electrode active material-containing layer 3b is provided on part of both surfaces of the negative electrode current collector 3a. The positive electrode active material-containing layer 5b is provided on part of both surfaces of the positive electrode current collector 5a. Of the negative electrode current collector 3a, a portion not having the negative electrode active material-containing layer 3b disposed thereon serves as a negative electrode tab 3c. Of the positive electrode current collector 5a, a portion not having the positive electrode active material-containing layer 5b disposed thereon serves as a positive electrode tab.

The positive electrode 5 is housed in the container member 2 in a state in which the positive electrode tab 5c projects outside. The negative electrode 3 is housed in the container member 2 in a state in which the negative electrode tab 3c projects outside. The first hydrogel electrolyte 11 and second electrolyte 12 are housed in the container member 2. The first hydrogel electrolyte covers the negative electrode 3.

The first hydrogel electrolyte 11 contained in the secondary battery 100 illustrated in FIG. 4 contains the hydrogel and the first aqueous electrolyte at least a part of which is included within the hydrogel. The second electrolyte 12 is a liquid electrolyte. The liquid electrolyte hardly permeates the hydrogel electrolyte. Even when some liquid electrolyte permeates the hydrogel electrolyte, a degree of permeation is within a range where there is no influence on the secondary battery. In addition, the hydrogel has a property of strongly retaining the first aqueous electrolyte. Therefore, the first aqueous electrolyte in the first hydrogel electrolyte 11 and the second electrolyte 12 do not become mixed. Although not illustrated in the drawings, a liquid electrolyte not containing the hydrogel may be used in place of the first hydrogel electrolyte 11 at the side of the negative electrode 3, and the second hydrogel electrolyte in which the liquid second electrolyte 12 is included within the hydrogel may be used at the side of the positive electrode 5.

As illustrated in FIG. 4, preferably, the first hydrogel electrolyte 11 is in contact with only the negative electrode 3, among the negative electrode 3 and the positive electrode 5. When the first hydrogel electrolyte 11 containing the first aqueous electrolyte having the first electrolyte composition suitable for the side of the negative electrode 3 is in contact with only the negative electrode 3, it is possible to inhibit the first aqueous electrolyte from infiltrating the side of the positive electrode 5. As illustrated in the drawings, it is desirable to dispose the first hydrogel electrolyte 11 in such a manner that a boundary by which the side of the negative electrode 3 is distinguished from the side of the positive electrode 5 is formed by an interface between the first hydrogel electrolyte and the second electrolyte.

FIG. 5 is a view illustrating an example of the secondary battery in which the first hydrogel electrolyte 11 is still used at the side of the negative electrode 3, and a second hydrogel electrolyte 13 is used at the side of the positive electrode 5. By covering both the negative electrode 3 and the positive electrode 5 with the hydrogel electrolytes, a solution of the first electrolyte hardly mixes with a solution of the second electrolyte. Even when some solution of the first electrolyte and some solution of the second electrolyte permeate the first and second hydrogel electrolytes, the degree of permeation is within a range in which the secondary battery would not be influenced. Even in this case, it is possible to dispose electrolytes having compositions suitable for each of the positive electrode and the negative electrode, respectively near the positive and negative electrodes. Preferably, the first hydrogel electrolyte 11 is in contact with only the negative electrode 3, among the negative electrode 3 and the positive electrode 5. In addition, desirably, the second hydrogel electrolyte 13 is in contact with only the positive electrode 5, among the negative electrode 3 and the positive electrode 5.

Subsequently, a further other example of the secondary battery according to the embodiment will be described with reference to FIGS. 6 and 7.

FIG. 6 is a sectional view schematically showing an example of the secondary battery according to the embodiment. FIG. 7 is an enlarged sectional view showing section A in FIG. 6.

The secondary battery 100 shown in FIGS. 6 and 7 includes a wound electrode group 1 in a flat form.

The electrode group 1 includes the negative electrode 3, the separator 4, the positive electrode 5, and the first hydrogel electrolyte 11, as shown in FIG. 7. The first hydrogel electrolyte 11 is disposed on both of reverse surfaces of the negative electrode 3. The separator 4 is present between the first hydrogel electrolyte 11 and the positive electrode 5. The first hydrogel electrolyte 11 contains a hydrogel and a first aqueous electrolyte contained within the hydrogel.

The negative electrode 3 includes the negative electrode current collector 3a and negative electrode active material-containing layers 3b formed on both of reverse surfaces thereof.

The positive electrode 5 includes the positive electrode current collector 5a and positive electrode active material-containing layers 5b. At the portion of the positive electrode 5 positioned outermost among the wound electrode group 1, the positive electrode active material-containing layer 5b is formed only on an inner surface of the positive electrode current collector 5a, as shown in FIG. 7. For the other portions of the positive electrode 5, positive electrode active material-containing layers 5b are formed on both of reverse surfaces of the positive electrode current collector 5a.

As shown in FIG. 6, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Although the electrode group had a wound structure in the example of the secondary battery shown in FIGS. 6 and 7, the form of the electrode group is not limited thereto. The secondary battery may include, for example, an electrode group having a stacked structure.

The secondary battery according to the first embodiment includes a negative electrode, a positive electrode, a first electrolyte, a second electrolyte, and a hydrogel electrolyte. The first electrolyte is in contact with at least a part of the negative electrode. The second electrolyte is in contact with at least a part of the positive electrode. The hydrogel electrolyte includes a gel having a chemically crosslinked structure. A first electrolyte composition of the first electrolyte and a second electrolyte composition of the second electrolyte differ from one another. At least one of the first electrolyte and the second electrolyte is an aqueous electrolyte including an aqueous solvent that includes water. Regarding at least one of the negative electrode and the positive electrode, at least a part of the electrode overlaps at least a part of the hydrogel electrolyte. With such a configuration, there can be provided a secondary battery that is excellent in charge-discharge efficiency, self-discharge-resistance performance, and life performance.

Second Embodiment

According to a second embodiment, a battery module is provided. The battery module according to the second embodiment includes plural of secondary batteries according to the first embodiment.

In the battery module according to the second embodiment, each of the single-batteries may be arranged to be electrically connected in series or in parallel, or may be arranged in combination of in-series connection and in-parallel connection.

An example of the battery module according to the second embodiment will be described next with reference to the drawings.

FIG. 8 is a perspective view schematically showing an example of the battery module according to the second embodiment. The battery module 200 shown in FIG. 8 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 8 is a battery module of five in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the second embodiment includes a secondary battery according to the first embodiment. Therefore, the battery module according to the second embodiment can exhibit excellent charge and discharge efficiency, self-discharge-resistance performance, and life performance.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 9:
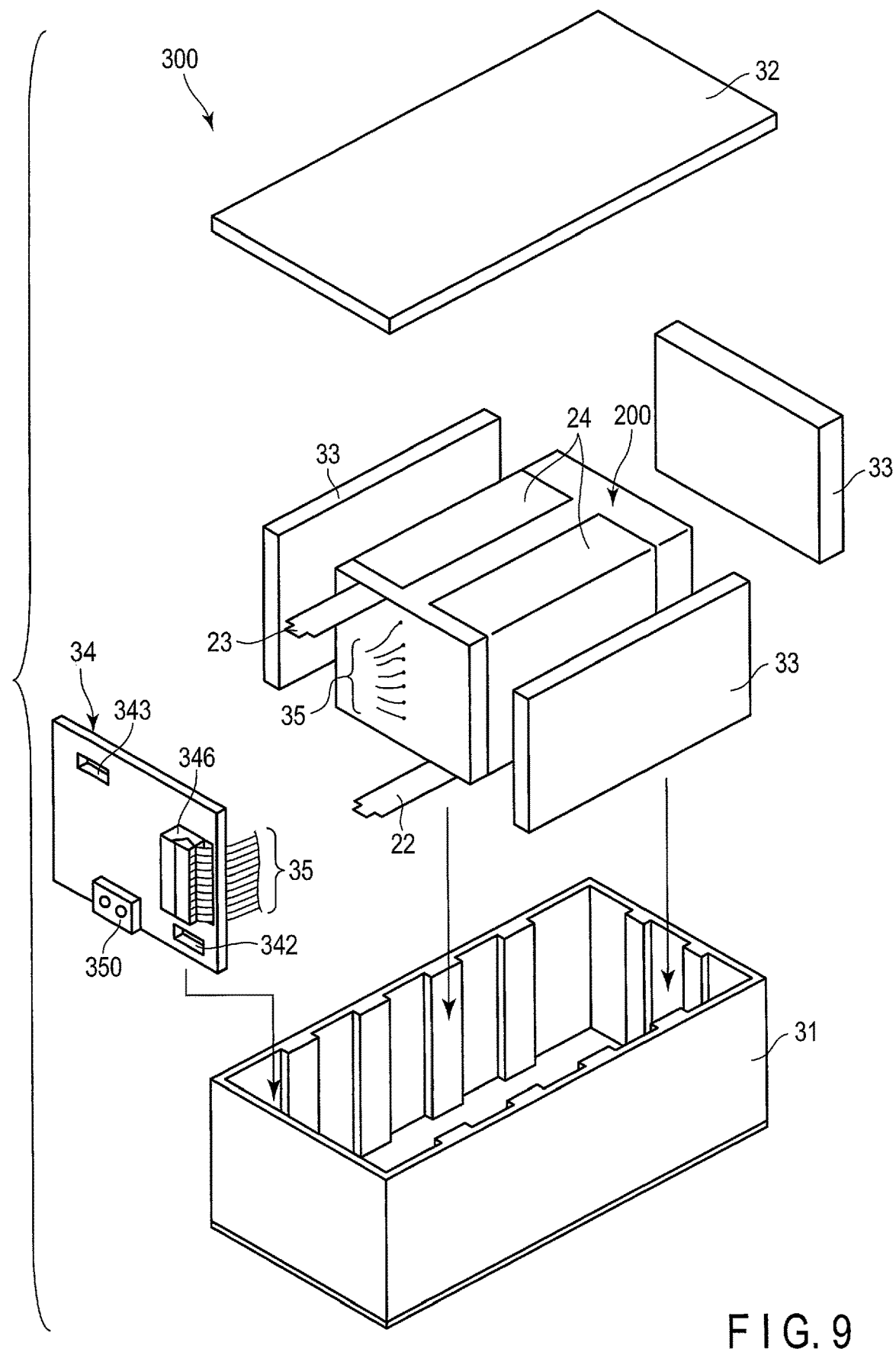
FIG. 9 is an exploded perspective view schematically showing an example of a battery pack according to an embodiment.
Figure 10:
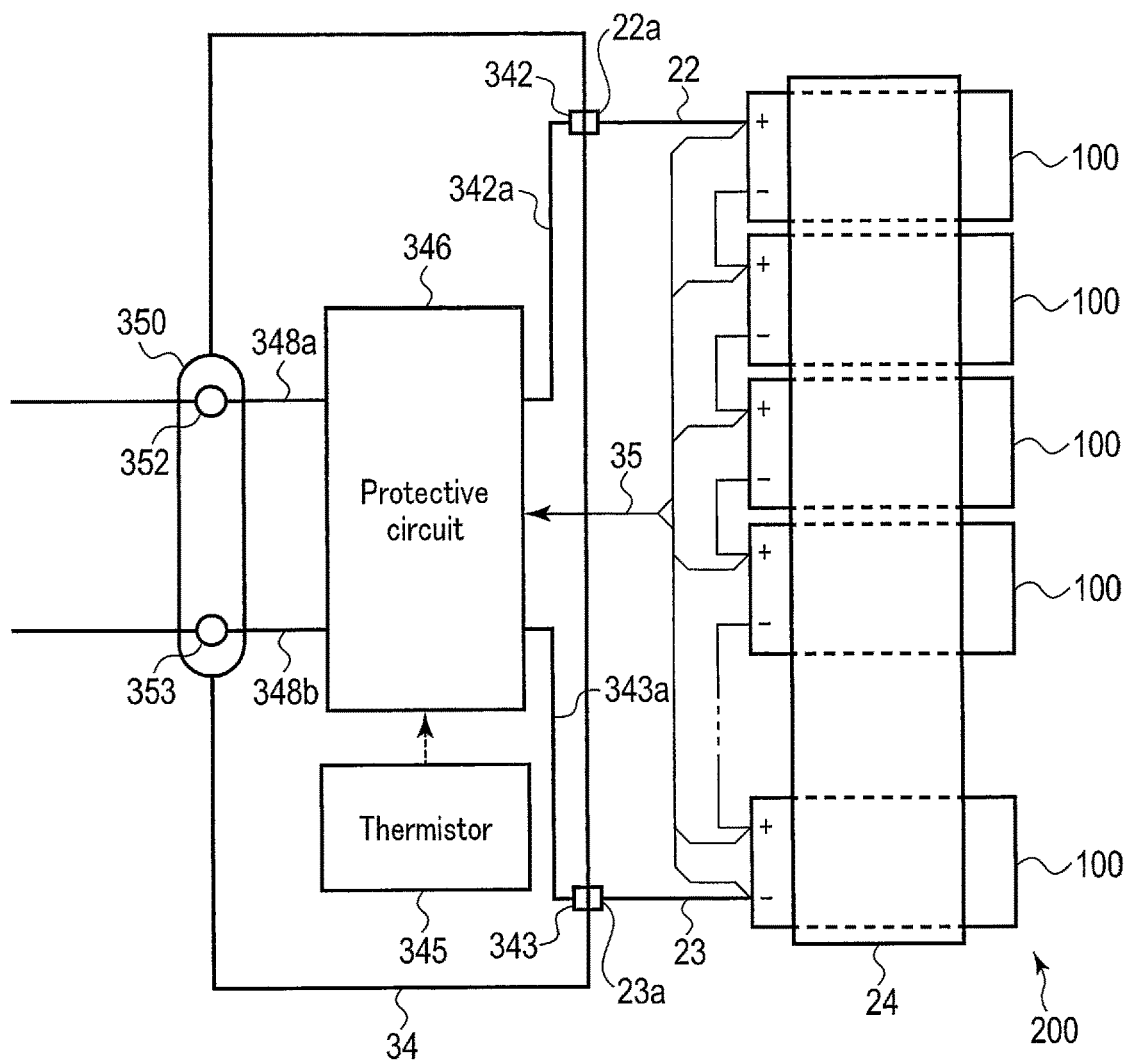
FIG. 10 is a block diagram showing an example of an electric circuit of the battery pack shown in FIG. 9.

FIG. 9 is an exploded perspective view schematically showing an example of the battery pack according to the third embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode side connector 343, a thermistor 345, a protective circuit 346, wirings 342a and 343a, an external power distribution terminal 350, a plus-side (positive-side) wiring 348a, and a minus-side (negative-side) wiring 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the third embodiment is provided with the secondary battery according to the first embodiment or the battery module according to the second embodiment. Accordingly, the battery pack can exhibit high input-output efficiency, self-discharge-resistance performance, and life performance.

Fourth Embodiment

According to a fourth embodiment, a vehicle is provided. The vehicle includes with the battery pack according to the third embodiment.

In the vehicle according to the fourth embodiment, the battery pack is configured, for example, to recover regenerative energy from motive force of the vehicle. The vehicle according to the fourth embodiment includes a mechanism (e.g., a regenerator) for converting kinetic energy of the vehicle into regenerative energy.

Examples of the vehicle according to the fourth embodiment include two- to four-wheeled hybrid electric automobiles, two- to four-wheeled electric automobiles, power assisted bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may be equipped with plural battery packs. In such a case, the battery packs may be electrically connected in series, in parallel, or in a combination of in-series connection and in-parallel connection.

Next, an example of the vehicle according to the fourth embodiment will be described with reference to the drawings.

Figure 11:
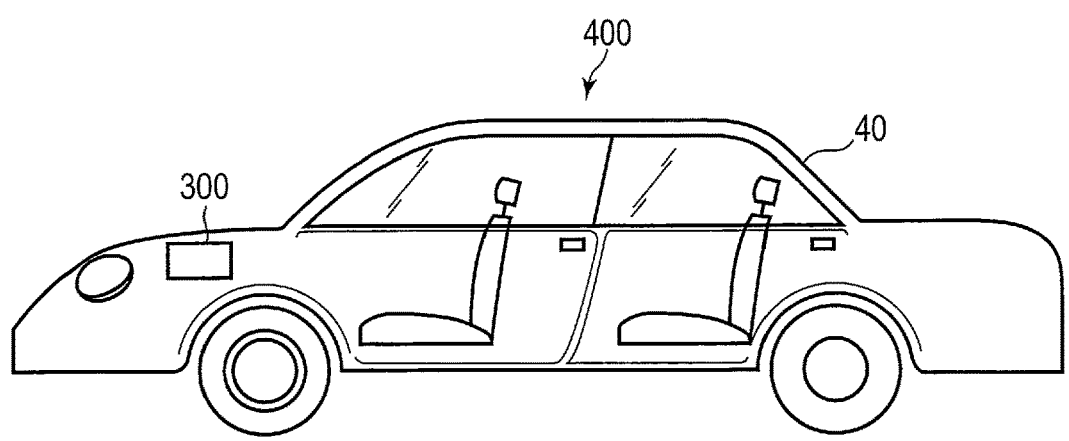
FIG. 11 is a partial see-through diagram schematically showing an example of the vehicle according to an embodiment.

FIG. 11 is a sectional view schematically showing an example of a vehicle according to the fourth embodiment.

The vehicle 400 shown in FIG. 11 includes a vehicle body 40 and a battery pack 300 according to the third embodiment. The vehicle 400 shown in FIG. 11 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 11, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

The vehicle according to the fourth embodiment has the battery pack according to the third embodiment installed therein. Therefore, since the battery pack can exhibit excellent charge and discharge efficiency, a vehicle with high performance can be obtained. Furthermore, since the battery pack can exhibit excellent self-discharge-resistance performance and life performance, the vehicle has high reliability.

Fifth Embodiment

According to a fifth embodiment, a stationary power supply is provided. The stationary power supply includes the battery pack according to the third embodiment. Note that instead of a battery pack according to the third embodiment, the stationary power supply may have the battery module according to the second embodiment or the secondary battery according to the first embodiment installed therein.

The stationary power supply according to the fifth embodiment has the battery pack according to the third embodiment installed therein. Therefore, the stationary power supply according to the fifth embodiment can exhibit excellent charge and discharge efficiency and excellent cycle performance.

FIG. 12 is a block diagram showing an example of a system including the stationary power supply according to the fifth embodiment. FIG. 12 is a diagram showing an application example to stationary power supplies 112, 123 as an example of use of battery packs 300A, 300B according to the third embodiment. In the example shown in FIG. 12, shown is a system 110 in which the stationary power supplies 112, 123 are used. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large capacity of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples will be described below. The embodiments are not limited to the following examples.

Example 1

<Production of Positive Electrode>

Positive electrodes were produced in the following manner.

First, a positive electrode active material, an electro-conductive agent, and a binder were dispersed in an N-methyl-2-pyrrolidone (NMP) solvent to prepare a slurry. The proportions of the electro-conductive agent and binder were respectively 10 parts by mass and 10 parts by mass, with respect to 100 parts by mass of positive electrode active material. As the positive electrode active material, a lithium manganese composite oxide ($LiMn_2O_4$) having a spinel structure and an average particle size of 10 µm was used. The lithium ion insertion/extraction potential of the lithium manganese composite oxide was 3.5 V (vs. Li/Li$^+$) to 4.2 V (vs. Li/Li$^+$). As the electro-conductive agent, graphite powder was used. As the binder, polyvinylidene fluoride (PVdF) was used.

Next, the prepared slurry was applied onto both surfaces of a positive electrode current collector, and the applied slurry coatings were dried, thereby forming positive electrode active material-containing layers. As the positive electrode current collector, a Ti foil having a thickness of 12 µm was used. Here, when applying the slurry onto the Ti foil, for a part to be located outermost in the electrode group among the positive electrodes being produced, the slurry was applied to only one surface of the Ti foil. For the remainder, the slurry was applied onto both surfaces of the Ti foil. The positive electrode current collector and the positive electrode active material-containing layers thereon were pressed to prepare positive electrodes.

<Production of Negative Electrode>

Negative electrodes were produced in the following manner.

A lithium titanium oxide ($Li_4Ti_5O_{12}$) powder having an average secondary particle size (diameter) of 15 µm was used as negative electrode active material, graphite powder was used as electro-conductive agent, and PTFE was used as binder. The lithium ion insertion/extraction potential of $Li_4Ti_5O_{12}$ was 1.5 V (vs. Li/Li$^+$) to 1.7 V (vs. Li/Li$^+$). The negative electrode active material, electro-conductive agent, and binder were mixed at respective proportions of 100 parts by mass, 10 parts by mass, and 10 parts by mass, and then dispersed in an NMP solvent to prepare a slurry. The obtained slurry was applied onto both surfaces of a Zn foil having a thickness of 20 µm as negative electrode current collector, and the applied slurry coatings were dried, thereby forming negative electrode active material-containing layers. Next, the negative electrode current collector and the negative electrode active material-containing layers thereon were pressed to obtain negative electrodes having a density of 2.0 g/cm$^3$ (excluding the current collector).

<Production of Hydrogel Sheet>

Prepared was an aqueous solution having 6 mol/L of lithium chloride (LiCl) and 1 mol/L of lithium hydroxide (LiOH) dissolved therein. Gellan gum was dissolved in the aqueous solution at a concentration of 10 wt %. Subsequently, ethylene glycol diglycidyl ether was added at a mass of three times with respect to the gellan gum under a 5° C. environment, and the solution was stirred until uniform. This solution was applied onto a cellulose nonwoven fabric having a thickness of 15 µm then kept still under a 40° C. environment for three hours, and thereby a hydrogel sheet was produced. The hydrogel sheet will be referred to as HG1, herein.

<Production of Electrode Group>

6 mol/L of lithium chloride (LiCl) and 1 mol/L of lithium hydroxide (LiOH) were dissolved in water, whereby the first aqueous electrolyte was prepared. Each of the negative electrodes produced as described above was immersed in the first aqueous electrolyte, to thereby impregnate the first aqueous electrolyte into the negative electrode active material-containing layers. Then, HG1 cut to an area 1.1 times that of the negative electrode was disposed onto each of both surfaces of each negative electrode, then an end portion having only overlapped HG1 was pressed to pack in the negative electrode, and thereby each negative electrode was enveloped within a pouch formed by HG1. 15 µm thick cellulose nonwoven fabrics (air-permeability coefficient: $5 \times 10^{-14}$ m$^2$) were disposed as separators onto surfaces of each, and the positive electrodes produced as described above were stacked onto each to obtain stacks. Next, the stacks were stacked such that parts among the positive electrodes in which a slurry was applied only on one surface were positioned outermost, and thereby an electrode group was produced. The obtained electrode group was housed in a thin metal can made of stainless steel having a plate thickness of 0.25 mm. Incidentally, as the metal can, used was a can provided with a valve configured to leak gas when the internal pressure became 2 atm or more.

<Production and Initial Charge and Discharge of Secondary Battery>

As a liquid aqueous electrolyte (second aqueous electrolyte), 2 mol/L of a lithium sulfate ($Li_2SO_4$) aqueous solution was poured into the above described metal can container housing the electrode group, thereby producing a secondary battery. Next, the secondary battery was left standing under a 25° C. environment for 24 hours. Then, the secondary battery was submitted to initial charge and discharge under a 25° C. environment. In the initial charge and discharge, first, constant current charge was performed at a current of 5 A until the voltage of the secondary battery reached 2.8 V. Then, constant current discharge was performed at a current of 1 A until the voltage reached 2.1 V.

Example 2

A secondary battery was produced by the same method as described in Example 1, except that guar gum was used in place of gellan gum for the polysaccharide composing the hydrogel sheet.

Example 3

A secondary battery was produced by the same method as described in Example 1, except for using negative electrodes enveloped in hydrogel sheets produced as described below. Specifically, 12 mol/L of lithium chloride (LiCl) and 1 mol/L of lithium hydroxide (LiOH) were dissolved in water, whereby the first aqueous electrolyte was prepared. Except for using this first aqueous electrolyte as the aqueous solution, the hydrogel sheet was produced by the same method as described for HG1 of Example 1. Each negative electrode was immersed in the first aqueous electrolyte, to thereby impregnate the first aqueous electrolyte into the negative electrode active material-containing layers. Then, hydrogel sheets cut to an area 1.1 times that of the negative electrodes were disposed onto both surfaces of each negative electrode, then an end portion where only the hydrogel sheets overlap was pressed to pack in each negative electrode, and thereby hydrogel sheet-enveloped negative electrodes were produced.

Example 4

A secondary battery was produced by the same method as described in Example 1, except for using hydrogel sheets produced as described below. Specifically, a solution was prepared by dissolving gellan gum in ethanol at a concentration of 10 wt %. Subsequently, to the solution was added hexamethylene diisocyanate in a mass of three times with respect to the gellan gum, and the solution was stirred until a uniform solution was obtained. This solution was applied onto a cellulose nonwoven fabric having a thickness of 15 μm, and gelled by keeping still under a 70° C. environment for three hours. Subsequently, the solution was dried at 60° C. for a whole day to remove the ethanol, thereby producing a chemical gel sheet. The obtained chemical gel sheet was swollen by the same first aqueous electrolyte described in Example 1, thereby producing the hydrogel sheet.

Example 5

A secondary battery was produced by the same method as described in Example 1 except that a composite film described below was used as the separator in place of the cellulose nonwoven fabric.

<Production of Composite Film>

Glass solid electrolyte LATP ($Li_{1.5}Al_{0.5}Ti_{1.5}(PO_4)_3$) particles, polyvinyl butyral (PVB) resin and NMP were mixed, thereby obtaining a solution mixture. An average particle size of the LATP particles was 1.0 μm. A mass average molecular weight of the polyvinyl butyral resin was about 100,000. Incidentally, a mass ratio between the LATP particles and the polyvinyl butyral resin was 9:1. The solid content concentration in the solution mixture was 60 mass %.

Next, the solution mixture was mixed by a ball mill, thereby obtaining a slurry. Next, the slurry was applied onto one principal surface of a cellulose nonwoven fabric having a thickness of 15 μm by a doctor blade method, and the resulting coating was dried to obtain a separator. The thickness of the solid electrolyte layer formed on the nonwoven fabric was about 20 μm. The air-permeability coefficient of the obtained composite film was $2 \times 10^{-17}$ m².

Example 6

A secondary battery was produced by the same method as described in Example 1, except the separator was not used.

Example 7

<Production of Positive Electrode>

Positive electrodes were produced in the following manner.

First, a positive electrode active material, electro-conductive agent, and binder were dispersed in an N-methyl-2-pyrrolidone (NMP) solvent to prepare a slurry. The proportions of the electro-conductive agent and binder in the positive electrode active material-containing layer were respectively 10 parts by mass and 10 parts by mass, with respect to 100 parts by mass of positive electrode active material. As the positive electrode active material, the lithium manganese composite oxide ($LiMn_2O_4$) having the spinel structure and average particle size of 10 μm was used. As the electro-conductive agent, graphite powder was used. As the binder, polyvinylidene fluoride (PVdF) was used.

Next, the prepared slurry was applied onto both surfaces of a positive electrode current collector, and the resulting coatings were dried, thereby forming positive electrode active material-containing layers. As the positive electrode current collector, a Ti foil having a thickness of 12 μm was used. Next, the positive electrode current collector and the positive electrode active material-containing layers were pressed to prepare positive electrodes.

<Production of Negative Electrode>

Negative electrodes were produced in the following manner.

The lithium titanium oxide ($Li_4Ti_5O_{12}$) powder having an average secondary particle size (diameter) of 15 μm was used as negative electrode active material, graphite powder was used as electro-conductive agent, and PTFE was used as binder. The negative electrode active material, electro-conductive agent, and binder were mixed at respective proportions of 100 parts by mass, 10 parts by mass, and 10 parts by mass, and then dispersed in NMP solvent to prepare a slurry. The obtained slurry was applied onto both surfaces of a Zn foil having a thickness of 50 μm as negative electrode current collector, and the resulting coatings were dried, thereby forming negative electrode active material-containing layers. Here, when applying the slurry onto the Zn foil, for a part to be located outermost in the electrode group among the negative electrodes being produced, the slurry was applied to only one surface of the Zn foil. For the remainder, the slurry was applied onto both surfaces of the Zn foil. Next, the negative electrode current collector and the negative electrode active material-containing layers were pressed to obtain negative electrodes.

<Production of Hydrogel Sheet>

2 mol/L of lithium sulfate ($LiSO_2$) was dissolved in water to prepare an aqueous solution. Gellan gum was dissolved in the aqueous solution at a concentration of 10 wt %. Subsequently, ethylene glycol diglycidyl ether was added at a mass of three times with respect to the gellan gum under a 5° C. environment, and the solution was stirred until uniform. This solution was applied onto the cellulose nonwoven fabric of 15 μm thickness, then kept still under a 40° C. environment for three hours, and thereby a hydrogel sheet was produced. The hydrogel sheet will be referred to as HG2, herein.

<Production of Electrode Group>

2 mol/L of lithium sulfate ($Li_2SO_4$) was dissolved in water, whereby the second aqueous electrolyte was prepared. Each of the positive electrodes produced as described above was immersed in the second aqueous electrolyte, to thereby impregnate the second aqueous electrolyte into the positive electrode active material-containing layers. Then, HG2 cut to an area 1.1 times that of the positive electrode was disposed onto each of both surfaces of each positive electrode, then an end portion having only overlapped HG2 was pressed to pack in the positive electrode, and thereby each positive electrode was enveloped within a pouch formed by HG2. 15 μm thick cellulose nonwoven fabrics were disposed as separators onto surfaces of each, and the negative electrodes produced as described above were stacked onto each to obtain stacks. Next, the stacks were stacked such that parts among the negative electrodes in which a slurry was applied only on one surface were positioned outermost, and thereby an electrode group was produced. The obtained electrode group was housed in a thin metal can made of stainless steel of 0.25 mm plate thickness. Incidentally, as the metal can, used was a can provided with a valve configured to leak gas when the internal pressure became 2 atm or more.

<Production and Initial Charge and Discharge of Secondary Battery>

As a liquid aqueous electrolyte (first aqueous electrolyte), an aqueous solution of 6 mol/L of a lithium chloride (LiCl) and 1 mol/L of lithium hydroxide (LiOH) was poured into the above described metal can container housing the electrode group, thereby producing a secondary battery. Next, the secondary battery was left standing under a 25° C. environment for 24 hours. Then, the secondary battery was submitted to initial charge and discharge under a 25° C. environment. In the initial charge and discharge, first, constant current charge was performed at a current of 5 A until the voltage of the secondary battery reached 2.8 V. Then, constant current discharge was performed at a current of 1 A until the voltage reached 2.1 V.

Example 8

A secondary battery was produced as described below. Specifically, a negative electrode encased in HG1 was produced in the same manner as described in Example 1, a positive electrode encased in HG2 was produced in the same manner as described in Example 7, and two cellulose nonwoven fabrics each having a thickness of 15 μm were prepared as the separator. The negative electrode described above, one of the cellulose non-woven fabrics, the positive electrode described above, and the other cellulose nonwoven fabric were stacked in this order, thereby obtaining a stack. Next, plural of the stacks were stacked such that the cellulose nonwoven fabrics were positioned outermost, and thus, an electrode group was produced. The obtained electrode group was housed in a thin metal can made of stainless steel having a plate thickness of 0.25 mm. Incidentally, used as the metal can was a can provided with a valve configured to leak gas when the internal pressure became 2 atm or more.

The same initial charge and discharge as described in Example 1 was performed on the produced secondary battery.

Comparative Example 1

A secondary battery was produced as described below. Specifically, a positive electrode was produced in the same manner as described in Example 1, a negative electrode was produced in the same manner as described in Example 7, and two cellulose nonwoven fabrics each having a thickness of 15 μm were prepared as the separator. The hydrogel sheet was not provided for either of the negative electrode and the positive electrode. A first aqueous electrolyte and a second aqueous electrolyte were respectively prepared in the same manner as described in Example 1. The negative electrode was immersed in the first aqueous electrolyte, thereby impregnating the first aqueous electrolyte into the negative electrode active material-containing layer. The positive electrode was immersed in the second aqueous electrolyte, thereby impregnating the second aqueous electrolyte into the positive electrode active material-containing layer.

The negative electrode described above, one of the cellulose non-woven fabrics, the positive electrode described above, and the other cellulose nonwoven fabric were stacked in this order, thereby obtaining a stack. Next, plural of the stacks were stacked such that the cellulose nonwoven fabrics were positioned outermost, and thus, an electrode group was produced. The obtained electrode group was housed in a thin metal can made of stainless steel of 0.25 mm plate thickness. Incidentally, used as the metal can was a can provided with a valve configured to leak gas when the internal pressure became 2 atm or more.

The same initial charge and discharge as described in Example 1 was performed on the produced secondary battery.

Comparative Example 2

<Production of Electrode>

A positive electrode was produced in the same manner as described in Example 1, and a negative electrode was produced in the same manner as described in Example 7. Both the negative electrode and the positive electrode were produced in a state before the electrodes were impregnated with an aqueous electrolyte and before a hydrogel sheet was provided.

<Preparation of Aqueous Electrolyte and Production of Electrode Group>

As a first aqueous electrolyte, an aqueous solution mixture of 6 mol/L of lithium chloride (LiCl) and 1 mol/L of lithium hydroxide (LiOH) was prepared. As a second aqueous electrolyte, a 2 mol/L lithium sulfate ($Li_2SO_4$) aqueous solution was prepared. Gellan gum was mixed into the above described first aqueous electrolyte at 20 mass % with respect to the first aqueous electrolyte, and thereby a first aqueous electrolyte having a gel form was produced. The gel formed first aqueous electrolyte produced as described above was applied onto both surfaces of the negative electrode. Subsequently, the negative electrode was immersed in the first aqueous electrolyte of gel form such that the negative electrode active material-containing layers of the negative electrode was immersed therein.

As the separator, two cellulose non-woven fabrics having thicknesses of 20 μm were prepared. The negative electrode having the first aqueous electrolyte applied on both surfaces thereon as described above, one of the cellulose non-woven fabrics, the positive electrode described above, and the other cellulose nonwoven fabric were stacked in this order, thereby obtaining a stack. Next, an electrode group was produced in such a manner that the negative electrode was positioned outermost. The obtained electrode group was housed in a thin metal can made of stainless steel of 0.25 mm plate thickness. Incidentally, used as the metal can was a can provided with a valve configured to leak gas when the internal pressure became 2 atm or more. The second aqueous electrolyte was poured into the metal can, thereby producing a secondary battery.

The same initial charge and discharge as described in Example 1 was performed on the produced secondary battery.

<Durability of Hydrogel Sheet>

The hydrogel sheet contained in the secondary batteries according to Examples 1 to 8 and Comparative Example 2 was evaluated by the method described above. When the sheet maintained an original shape during the test, the sheet was evaluated as "good" and determined to be formed by a chemical gel. When the sheet disintegrated, the sheet was evaluated as "bad". The results thereof are shown in Table 1 below. For example, the gel on the negative electrode in Comparative Example 2 lost the shape during the test, and thereby the gel can be determined to be formed by a physical gel.

<Evaluation of Battery Performance>

Charge-discharge efficiency, self-discharge-resistance performance, and life performance of each of the secondary batteries according to Examples 1 to 8 and Comparative Examples 1 and 2 were evaluated as follows. The results thereof are shown in Table 2 below.

<Evaluation of Charge-Discharge Efficiency>

Each of the secondary batteries was charged to 2.8 V at a constant current of 3 A at under a 25° C. environment, and then the 30 minutes of resting time was provided. Subsequently, each of the secondary batteries was subjected to a discharge to 1.5 V and then another 30 minutes of resting time was provided. The cycle from the charging to the end of the second resting time was defined as one charge-and-discharge cycle. This charge-and-discharge cycle was repeated 10 times. Next, the discharge capacity and the charge capacity of each secondary battery after 10 cycles were measured, and the charge-discharge efficiency was calculated from the measured charge and discharge capacity (charge-discharge efficiency (%)=[discharge capacity/charge capacity]×100%).

<Evaluation of Self-Discharge-Resistance Performance>

After the eleventh charge operation, a retention time of 24 hours was provided, and capacity remaining ratio was calculated from the charge capacity before retention and the discharge capacity after 24-hour retention (capacity remaining ratio (%)=[discharge capacity after 24-hour retention/charge capacity before retention]×100%). The capacity remaining ratio serves as an index for self-discharge-resistance performance.

<Evaluation of Life Performance>

The charge-discharge cycle was further repeatedly performed with the conditions described above, and the discharge capacity at the one hundredth cycle was measured. The capacity retention ratio was calculated as a ratio between the measured value and the discharge capacity in the first cycle (capacity retention ratio (%)=[discharge capacity in one hundredth cycle/discharge capacity in first cycle]×100%). The value of the capacity retention ratio serves as an index for life performance.

Table 1 below shows results of the durability test of the hydrogel sheet and design of the secondary batteries according to Examples 1 to 8 and Comparative Examples 1 and 2. Specifically, Table 1 shows polysaccharides and crosslinking agents used for producing the hydrogel sheets, separators used in the batteries, for which electrodes between the positive and negative electrodes the hydrogel was used, and durability of the hydrogel sheet. Incidentally, a symbol of "-" in the tables means that the corresponding item is not applicable.

TABLE 1

|  | Polysaccharide | Crosslinking Agent | Separator | Electrode using hydrogel | Gel durability | First electrolyte | Second electrolyte |
| --- | --- | --- | --- | --- | --- | --- | --- |
| Example 1 | Gellan gum | Ethylene glycol diglycidyl ether | Cellulose fiber nonwoven fabric | Negative electrode | Good | 6M LiCl + 1M LiOH | 2M Li$_2$SO$_4$ |
| Example 2 | Guar gum | Ethylene glycol diglycidyl ether | Cellulose fiber nonwoven fabric | Negative electrode | Good | 6M LiCl + 1M LiOH | 2M Li$_2$SO$_4$ |
| Example 3 | Gellan gum | Ethylene glycol diglycidyl ether | Cellulose fiber nonwoven fabric | Negative electrode | Good | 12M LiCl + 1M LiOH | 2M Li$_2$SO$_4$ |
| Example 4 | Gellan gum | Hexamethylene diisocyanate | Cellulose fiber nonwoven fabric | Negative electrode | Good | 6M LiCl + 1M LiOH | 2M Li$_2$SO$_4$ |
| Example 5 | Gellan gum | Ethylene glycol diglycidyl ether | LATP-PVB composite film | Negative electrode | Good | 6M LiCl + 1M LiOH | 2M Li$_2$SO$_4$ |
| Example 6 | Gellan gum | Ethylene glycol diglycidyl ether | (None) | Negative electrode | Good | 6M LiCl + 1M LiOH | 2M Li$_2$SO$_4$ |
| Example 7 | Gellan gum | Ethylene glycol diglycidyl ether | Cellulose fiber nonwoven fabric | Positive electrode | Good | 6M LiCl + 1M LiOH | 2M Li$_2$SO$_4$ |
| Example 8 | Gellan gum | Ethylene glycol diglycidyl ether | Cellulose fiber nonwoven fabric | Both positive and negative electrodes | Good | 6M LiCl + 1M LiOH | 2M Li$_2$SO$_4$ |
| Comparative Example 1 | — | — | Cellulose fiber nonwoven fabric | — | — | 6M LiCl + 1M LiOH | 2M Li$_2$SO$_4$ |
| Comparative Example 2 | Gellan gum | — | Cellulose fiber nonwoven fabric | Negative electrode | Bad | 6M LiCl + 1M LiOH | 2M Li$_2$SO$_4$ |

Table 2 shows results of performance evaluation of the secondary batteries according to Examples 1 to 8 and Comparative Examples 1 and 2. Specifically, the charge-discharge efficiency, the capacity remaining ratio as an index of the self-discharge-resistance performance, and the capacity retention ratio as an index of the life performance are shown.

TABLE 2

|  | Charge-discharge efficiency | Capacity remaining ratio after 24-hour retention | Capacity retention ratio after 100 cycles |
| --- | --- | --- | --- |
| Example 1 | 94% | 64% | 89% |
| Example 2 | 92% | 62% | 87% |
| Example 3 | 97% | 72% | 95% |
| Example 4 | 90% | 74% | 85% |
| Example 5 | 95% | 85% | 90% |
| Example 6 | 82% | 62% | 72% |
| Example 7 | 91% | 91% | 91% |
| Example 8 | 92% | 72% | 90% |
| Comparative Example 1 | 38% | 0% | 12% |
| Comparative Example 2 | 66% | 46% | 46% |

As shown in the tables, the secondary batteries of Examples 1 to 8 were able to achieve the excellent charge-discharge efficiency, self-discharge-resistance performance and life performance. For example, the secondary batteries exhibited high remaining capacity even after the retention time of 24 hours elapsed from full charge.

As shown in Examples 1 to 4, even in a case where species of hydrogel or the composition of the electrolyte was changed, it was possible to achieve excellent charge-discharge efficiency, self-discharge-resistance performance and life performance.

In a case of using the composite film as the separator as shown in Example 5, it was possible to further improve the charge-discharge efficiency and the self-discharge-resistance performance.

As shown in Examples 7 and 8, even in a case of using the hydrogel at the positive electrode side or a case of using the hydrogel at both the negative electrode and the positive electrode, it was possible to achieve excellent charge-discharge efficiency, self-discharge-resistance performance and life performance.

As shown in Example 6, even in a case of employing a structure in which the separator was not used, it was possible to verify an effect of improving the charge-discharge efficiency, self-discharge-resistance performance and life performance by using the hydrogel.

The secondary batteries according to Comparative Examples 1 and 2, in which the hydrogel having the chemically cross-linked structure was not used, had remarkably low self-discharge-resistance performance and capacity retention ratio. This is considered to be because electrolysis of water was not suppressed at the negative electrode. The following is assumed as a factor thereof. It had not been able to maintain a state in which the first aqueous electrolyte at the negative electrode side is separated from the second aqueous electrolyte at the positive electrode side, whereby the first aqueous electrolyte and the second aqueous electrolyte had become mixed with each other.

According to at least one of the embodiments and examples described above, a secondary battery is provided. The secondary battery includes a negative electrode, a positive electrode, a first electrolyte, a second electrolyte, and a hydrogel electrolyte. The first electrolyte contacts at least a part of the negative electrode. The second electrolyte contacts at least a part of the positive electrode. The hydrogel electrolyte includes a gel having a chemically cross-linked structure. A first electrolyte composition of the first electrolyte and a second electrolyte composition of the second electrolyte are different from one another. At least one of the first electrolyte and the second electrolyte includes an aqueous electrolyte, which includes an aqueous solvent that includes water. At least a part of at least one between the negative electrode and the positive electrode is overlapped with at least a part of the hydrogel electrolyte. The secondary battery can suppress electrolysis of water at the negative electrode, and is therefore excellent in charge-discharge efficiency, self-discharge-resistance performance, and life performance. Therefore, according to the embodiments described above, there can be provided a secondary battery and battery pack excellent in charge-discharge efficiency and life performance, and a vehicle and stationary battery including this battery pack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a negative electrode;
   a positive electrode;
   a first electrolyte in contact with at least a part of the negative electrode;
   a second electrolyte in contact with at least a part of the positive electrode, the second electrolyte being a liquid electrolyte; and
   a hydrogel electrolyte comprising a gel having a chemically crosslinked structure, the hydrogel electrolyte comprising a part of the first electrolyte,
   wherein
   a first electrolyte composition of the first electrolyte differs from a second electrolyte composition of the second electrolyte,
   at least one of the first electrolyte and the second electrolyte comprises an aqueous solvent, the aqueous solvent comprising water,
   the hydrogel electrolyte has a bag-shape, wraps the negative electrode, and is in contact with the second electrolyte,
   the hydrogel electrolyte has alkali metal ion conductivity, and
   at least one of the first electrolyte and the second electrolyte comprises an alkali metal ion.

2. The secondary battery according to claim 1, further comprising a separator, wherein the separator has an air-permeability coefficient of $1 \times 10^{-13}$ m$^2$ or less.

3. The secondary battery according to claim 1, wherein the hydrogel electrolyte comprises a chemical gel having a structure in which a water-soluble polysaccharide is cross-linked by an epoxy compound or an isocyanate compound.

4. The secondary battery according to claim 1, wherein the first electrolyte and the second electrolyte further comprise an inorganic salt.

5. The secondary battery according to claim 1, wherein the negative electrode comprises a negative electrode active material, the negative electrode active material comprising a compound having a lithium ion insertion/extraction potential of 1 V (vs. Li/Li$^+$) to 3 V (vs. Li/Li$^+$) with respect to a potential based on metal lithium.

6. The secondary battery according to claim 1, wherein the positive electrode comprises a positive electrode active material, the positive electrode active material comprising a compound having a lithium ion insertion/extraction potential of 2.5 V (vs. Li/Li$^+$) to 5.5 V (vs. Li/Li$^+$) with respect to a potential based on metal lithium.

7. A battery pack comprising the secondary battery according to claim 1.

8. The battery pack according to claim 7, further comprising an external power distribution terminal and a protective circuit.

9. The battery pack according to claim 7, further comprising plural of the secondary battery, the secondary batteries being electrically connected in series, in parallel, or in combination of in-series connection and in-parallel connection.

10. A vehicle comprising the battery pack according to claim 7.

11. The vehicle according to claim 10, wherein the vehicle comprises a mechanism configured to convert kinetic energy of the vehicle into regenerative energy.

12. A stationary power supply comprising the battery pack according to claim 7.

13. The secondary battery according to claim 1, wherein both the first electrolyte and the second electrolyte comprise the aqueous solvent.

14. The secondary battery according to claim 1, wherein the bag-shape hydrogel electrolyte is in the form of a container that contains at least one of the negative electrode and the positive electrode.

15. The secondary battery according to claim 1, wherein each of the first electrolyte and the second electrolyte is an aqueous electrolyte comprising carrier ions having a concentration of 3 mol/L or more.

16. A secondary battery comprising:
- a negative electrode;
- a positive electrode;
- a first electrolyte in contact with at least a part of the negative electrode, the first electrolyte being a liquid electrolyte;
- a second electrolyte in contact with at least a part of the positive electrode; and
- a hydrogel electrolyte comprising a gel having a chemically crosslinked structure, the hydrogel electrolyte comprising a part of the second electrolyte, wherein
- a first electrolyte composition of the first electrolyte differs from a second electrolyte composition of the second electrolyte,
- at least one of the first electrolyte and the second electrolyte comprises an aqueous solvent, the aqueous solvent comprising water,
- the hydrogel electrolyte has a bag-shape, wraps the positive electrode, and is in contact with the first electrolyte,
- the hydrogel electrolyte has alkali metal ion conductivity, and
- at least one of the first electrolyte and the second electrolyte comprises an alkali metal ion.

* * * * *